US012741391B2

(12) United States Patent
Matsuda et al.

(10) Patent No.: US 12,741,391 B2
(45) Date of Patent: Sep. 22, 2026

(54) SLIT BLADE BLOCK AND ELECTRIC RAZOR

(71) Applicant: Panasonic Intellectual Property Management Co., Ltd., Osaka (JP)

(72) Inventors: Misaki Matsuda, Osaka (JP); Hiroaki Shimizu, Shiga (JP); Takehiro Nakagawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/844,408

(22) PCT Filed: Mar. 15, 2023

(86) PCT No.: PCT/JP2023/009978

§ 371 (c)(1),
(2) Date: Sep. 6, 2024

(87) PCT Pub. No.: WO2023/189571

PCT Pub. Date: Oct. 5, 2023

(65) Prior Publication Data

US 2025/0236031 A1 Jul. 24, 2025

(30) Foreign Application Priority Data

Mar. 28, 2022 (JP) ................................ 2022-051797

(51) Int. Cl.

| | |
|---|---|
| ***B26B 19/42*** | (2006.01) |
| ***B26B 19/04*** | (2006.01) |
| ***B26B 19/06*** | (2006.01) |

(52) U.S. Cl.

CPC ........... *B26B 19/42* (2013.01); *B26B 19/042* (2013.01); *B26B 19/06* (2013.01)

(58) Field of Classification Search

CPC ......... B26B 19/42; B26B 19/38; B26B 19/07; B26B 19/042; B26B 19/06; B26B 19/10; B26B 19/12; B26B 19/384; B26B 19/046

(Continued)

(56) References Cited

U.S. PATENT DOCUMENTS 2,228,258 A * 1/1941 Dalkowitz .............. B26B 19/42 30/34.2

3,983,626 A * 10/1976 Jensen .................. B26B 19/042 30/34.2

(Continued)

FOREIGN PATENT DOCUMENTS

CN 107107351 A 8/2017
CN 208914177 U 5/2019

(Continued)

OTHER PUBLICATIONS

International Search Report of PCT application No. PCT/JP2023/009978 dated May 9, 2023.

(Continued)

*Primary Examiner* — Ghassem Alie
(74) *Attorney, Agent, or Firm* — RIMON P.C.

(57) ABSTRACT

The present disclosure provides a slit blade block and an electric razor capable of more efficiently shaving body hair while suppressing stimulation to skin. The slit blade block according to the present disclosure includes a slit outer blade having a plurality of outer blade pieces extending in a first direction and spaced apart from each other along a second direction intersecting the first direction. The slit blade block further includes a comb component comprising a plurality of combs that are disposed outside the slit outer blade in the first direction and spaced apart from each other along the second direction. The comb component comprises a protrusion protruding outward in the first direction, and the pro- (Continued)

trusion includes a first protrusion extending across two or more of combs disposed side by side in the second direction.

15 Claims, 12 Drawing Sheets

(58) Field of Classification Search
USPC .... 30/228, 34.2, 43.91, 43.92, 90, 179, 200, 30/201, 232.5
See application file for complete search history.

(56) References Cited

U.S. PATENT DOCUMENTS

| | | | | |
|---|---|---|---|---|
| 2010/0299937 | A1* | 12/2010 | Geiser | B23K 26/354<br>76/104.1 |
| 2016/0082606 | A1* | 3/2016 | Man Wong | B26B 19/06<br>30/208 |
| 2016/0176058 | A1 | 6/2016 | Piesker et al. | |
| 2020/0130205 | A1 | 4/2020 | Iaccarino | |
| 2020/0376697 | A1 | 12/2020 | Kondo et al. | |

FOREIGN PATENT DOCUMENTS

| | | |
|---|---|---|
| CN | 112008769 A | 12/2020 |
| JP | 2020-195475 | 12/2020 |

OTHER PUBLICATIONS

English Translation of Chinese Search Report dated Aug. 5, 2026 for the related Chinese Patent Application No. 202380027876.2.

* cited by examiner

SLIT BLADE BLOCK AND ELECTRIC RAZOR

CROSS-REFERENCE TO RELATED APPLICATIONS

This application is a U.S. national stage application of the PCT International Application No. PCT/JP2023/009978 filed on Mar. 15, 2023, which claims the benefit of foreign priority of Japanese patent application No. 2022-051797 filed on Mar. 28, 2022, the contents all of which are incorporated herein by reference.

TECHNICAL FIELD

The present disclosure relates to a slit blade block and an electric razor.

BACKGROUND ART

As disclosed in PTL 1, in an electric razor, a slit blade block has been conventionally known. The slit blade block includes a slit outer blade having a plurality of outer blade pieces and a slit inner blade having a plurality of inner blade pieces. The slit blade block is used for performing rough shaving to shorten a whisker which is long to some extent.

PTL 1 discloses that the slit blade block includes combs provided outside the slit outer blade in order to improve introduction properties of whiskers without changing a size of an interval between the outer blade pieces of the slit outer blade.

CITATION LIST

Patent Literature

PTL 1: Unexamined Japanese Patent Publication No. 2020-195475

SUMMARY OF THE INVENTION

Technical Problem

It is preferable that, when the slit blade block including the combs described above is used, not only hair can be shaved efficiently but also stimulation given to skin can be suppressed.

It is thus an object of the present disclosure to provide a slit blade block and an electric razor with which body hair can be shaved more efficiently and stimulation given to the skin can be suppressed.

Solution to Problem

A slit blade block according to an aspect of the present disclosure includes: a slit outer blade having a plurality of outer blade pieces extending in a first direction and spaced apart from each other along a second direction intersecting the first direction; and a comb component comprising a plurality of combs provided outside the slit outer blade in the first direction and spaced apart from each other along the second direction, the outer blade pieces adjacent to each other in the second direction including an outer slit formed between the corresponding outer blade pieces, the combs adjacent to each other in the second direction including a groove communicating with the outer slit, the groove being formed between the corresponding combs, the comb component being provided with a protrusion protruding outward in the first direction, and the protrusion including a first protrusion that extends across two or more of the combs disposed side by side in the second direction.

An electric razor according to an aspect of the present disclosure includes the slit blade block described above.

Advantageous Effect of Invention

The present disclosure provides a slit blade block and an electric razor with which body hair can be shaved more efficiently and stimulation to the skin can be suppressed.

DESCRIPTION OF EMBODIMENT

Hereinafter, an exemplary embodiment will be described in detail with reference to the drawings. However, detailed description more than necessary may not be described. For example, a detailed description of already well-known matters or a duplicated description of a substantially identical configuration may not be described.

The accompanying drawings and the following description are presented only to help those skilled in the art fully understand the present disclosure and are not intended to limit the subject matters described in the scope of claims.

In the exemplary embodiments below and their modifications, a direction in which multiple blade blocks are disposed side by side will be described as an X-direction (i.e., a first direction, a front-back direction, or a shaving direction), and a direction in which each of the blade blocks extends will be described as a Y-direction (i.e., a second direction, or a left-right direction). Additionally, an up-down direction in a state where a head part (i.e., one element of the electric razor) is disposed in such a way that a skin contact surface faces upward will be described as a Z-direction (i.e., a third direction, or the up-down direction). A side on which a power supply of the electric razor is provided will be described as a front side in the X-direction.

The X-direction, the Y-direction, and the Z-direction also will be used to describe a direction of a slit blade block. That is, in a state where the slit blade block is attached to the razor body, the directions which corresponds to the X-direction, the Y-direction, and the Z-direction of the slit blade block are defined as the X-direction, the Y-direction, and the Z-direction of the slit blade block, respectively. cl Exemplary Embodiment First, a configuration of electric razor 1 will be described with reference to FIG. 1.

Figure 1:
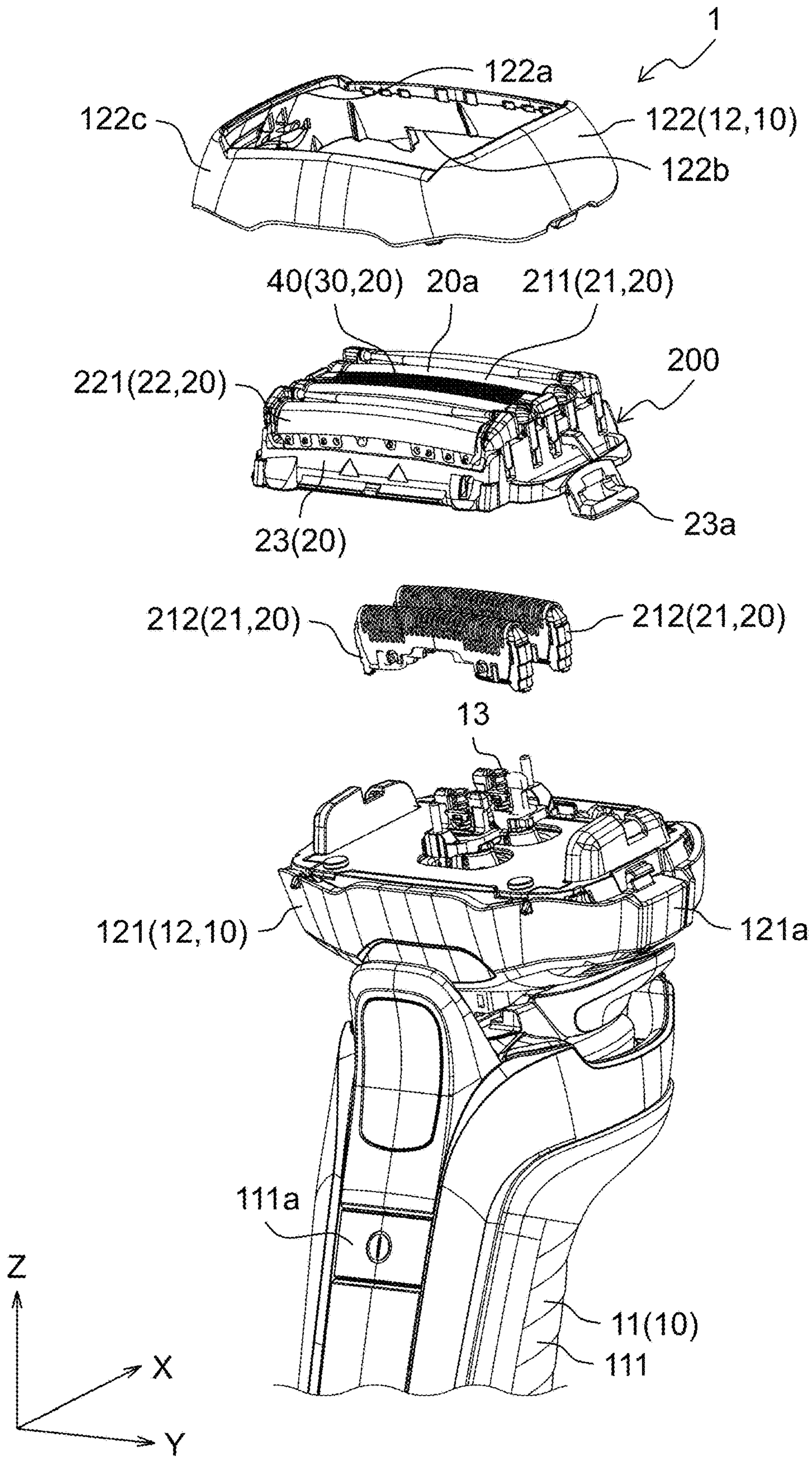
FIG. 1 is a partially exploded perspective view of an electric razor according to an exemplary embodiment.

FIG. 1 is a partially exploded perspective view of electric razor 1 according to the exemplary embodiment. As illustrated in FIG. 1, electric razor 1 according to the present exemplary embodiment includes razor body 10 and blade unit 20 that is held on razor body 10 in a state where skin contact surface 20*a* (i.e., a surface of an outer blade of each blade block, which will be described later) exposed.

Razor body 10 includes grip part 11 that can be held by hand, and head part 12 supported by grip part 11. In the present exemplary embodiment, head part 12 is supported by grip part 11 in a state where an extension direction of grip part 11 substantially corresponds to the up-down direction and in a state of being inclined upward and forward.

Head part 12 can be swung in the Y-direction with respect to grip part 11 about a shaft part (not illustrated) extending in the X-direction as an axis. Head part 12 can also be swung in the X-direction with respect to grip part 11 with a shaft part (not illustrated) extending in the Y-direction as an axis. Head part 12 further can float in the Z-direction with respect to grip part 11.

These swing and float can be appropriately combined to form another configuration. For example, head part 12 may be configured not only to be swingable in the X-direction and the Y-direction with respect to grip part 11 but also to be floatable in the Z-direction with respect to grip part 11.

Head part 12 may be configured not to swing or float with respect to grip part 11. Head part 12 may be configured not to be inclined with respect to grip part 11.

Grip part 11 includes a body housing 111, and a cavity is provided inside body housing 111. Various electric components such as a rechargeable battery are housed in the cavity provided inside body housing 111.

Body housing 111 is provided with power supply switch 111*a* of a press type for operating (i.e., turning on and off) electric razor 1. Although the switch of a press type as power supply switch 111*a* is exemplified in the present exemplary embodiment, a switch of a slide type or another switch may be used as long as the switch can turn on and off the power supply.

In the present exemplary embodiment, power supply switch 111*a* is provided on a front surface of body housing 111, that is, on a front surface (i.e., a front) of electric razor 1. The front surface of electric razor 1 refers to a side surface facing a user in a state where the user grips grip part 11 of electric razor 1 in normal use.

A trimmer unit can be provided at a rear part of body housing 111 (i.e., at a rear part of electric razor 1)

Head part 12 includes head part body 121 attached to grip part 11 and head cover 122 detachably attached to head part body 121. In the present exemplary embodiment, when release buttons 121*a* provided on respective left and right ends of head part body 121 in a retractable manner are retracted inward, attachment between head cover 122 and head part body 121 is released.

A drive mechanism is housed in head part body 121. The drive mechanism includes a plurality of drive poles 13, and is housed in head part body 121 in a state where drive poles 13 protrudes upward from head part body 121. As such a drive mechanism, conventionally known available examples include a linear actuator of a vibration type, and a drive mechanism including a rotary motor and a conversion mechanism that converts rotational motion into reciprocating linear motion.

Blade unit 20 includes two first blade blocks 21, two second blade blocks 22, one slit blade block 30, and outer blade case 23, and the five blade blocks are disposed side by side in the X-direction in a state where their longitudinal directions correspond to the Y-direction.

As described above, in the present exemplary embodiment, each of the blade blocks has a predetermined length and width, and these blade blocks are each disposed in a state where the length direction thereof substantially corresponds to the Y-direction (i.e., the second direction or the left-right direction) of electric razor 1 and where the width direction thereof substantially corresponds to the X-direction (i.e., the first direction, front-back direction, or shaving direction) of electric razor 1.

First blade block 21 mainly has a function of cutting off whisker H (i.e., an example of body hair, see FIG. 17, which will be described later) in a fallen state, and second blade block 22 mainly has a function of cutting off whisker H (i.e., an example of body hair) in a short standing state. Slit blade block 30 mainly has a function of cutting off thin long whisker H (i.e., body hair).

In the present exemplary embodiment, one slit blade block 30 is disposed at the center in the X-direction and two first blade blocks 21 are disposed on respective sides across slit blade block 30. Two second blade blocks 22 are disposed to be positioned opposite to slit blade block 30 with respect to first blade block 21. That is, two second blade blocks 22 are disposed at both ends in the X-direction.

Blade unit 20 is only required to include at least one slit blade block 30, and may include four or less blade blocks, or may include six or more blade blocks. Additionally, an alignment sequence of each blade block can be appropriately set.

First blade block 21 includes first net blade 211 and first inner blade 212. In the present exemplary embodiment, first net blade 211 is formed by being curved in an inverted U-shape convex upward in a side view (i.e., in a state viewed in the Y-direction). First net blade 211 is also formed by being slightly curved in the Y-direction (i.e., outer blade length direction) so as to be convex upward in front view (i.e., in a state viewed in the X-direction). For example, many circular blade holes (not illustrated) are provided in first net blade 211. First net blade 211 may be provided without being curved so as to be convex upward in front view. For example, when first net blade 211 is viewed from the front (i.e., in a state viewed in the X-direction), an apex of first net blade 211 may be a straight line extending in the Y-direction (i.e., outer blade length direction).

First inner blade 212 has an inverted U-shape along a curved shape of first net blade 211, and is disposed inside first net blade 211 (i.e., below first net blade 211, a side opposite to a side of first net blade 211 in contact with skin S (see FIG. 17, which will be described later)). First inner blade 212 is detachably attached to one of the plurality of drive poles 13. When a power supply of electric razor 1 is turned on and drive pole 13 is driven in a state where first inner blade 212 is disposed inside first net blade 211 and where first inner blade 212 is attached to drive pole 13, first inner blade 212 is displaced relative to first net blade 211 (i.e., is relatively moved, or is reciprocated in the Y-direction) while being in sliding contact with an inner surface of first net blade 211.

Similarly, second blade block 22 includes second net blade 221 and a second inner blade (not illustrated). In the present exemplary embodiment, second net blade 221 is also provided by being curved in an inverted U-shape protruding upward in a side view (i.e., in a state viewed in the Y-direction). Second net blade 221 is also formed by being slightly curved in the Y-direction (i.e., outer blade length direction) so as to be convex upward in a front view (i.e., in a state viewed in the X-direction). For example, many circular blade holes (not illustrated) are also provided in second net blade 221. Second net blade 221 may be provided without being curved so as to be convex upward in front view. For example, when second net blade 221 is viewed from the front (i.e., in a state viewed in the X-direction), an apex of second net blade 221 may be a straight line extending in the Y-direction (i.e., outer blade length direction).

Although not illustrated, similarly to first inner blade 212, the second inner blade has an inverted U-shape along a curved shape of second net blade 221, and is disposed inside second net blade 221 (i.e., below second net blade 221, or a side opposite to a side of second net blade 221 in contact with skin S). The second inner blade is detachably attached to one of the plurality of drive poles 13 (i.e., drive pole 13 different from the drive pole to which first inner blade 212 is attached). When the power supply of electric razor 1 is turned on and drive pole 13 is driven in a state where the second inner blade is disposed inside second net blade 221 and where the second inner blade is attached to drive pole 13, the second inner blade is displaced relative to second net blade 221 (i.e., is relatively moved, or reciprocates in the Y-direction) while being in sliding contact with an inner surface of second net blade 221.

Slit blade block 30 includes slit outer blade 40 and slit inner blade 50 (see FIG. 2, which will be described later). In the present exemplary embodiment, slit outer blade 40 is formed by being bent in an inverted U-shape convex upward in side view (i.e., in a state viewed in the Y-direction). Slit outer blade 40 is also formed by being slightly curved in the Y-direction (outer blade length direction) so as to be convex upward in front view (i.e., in a state viewed in the X-direction). Slit outer blade 40 is provided with many blade holes each in the shape of a slit (i.e., outer slit 416, see FIG. 2). Slit outer blade 40 may be provided without being curved so as to be convex upward in front view. For example, when slit outer blade 40 is viewed from the front (i.e., in a state viewed in the X-direction), an apex of slit outer blade 40 may be a straight line extending in the Y-direction (i.e., outer blade length direction). That is, slit outer blade 40 may be provided such that an upper surface (i.e., skin contact surface 4111 (see FIG. 3)) of top wall 411, which will be described later (see FIG. 12), is a plane (i.e., a flat surface).

Slit inner blade 50 has an inverted U-shape along a bent shape of slit outer blade 40, and is disposed inside slit outer blade 40 (i.e., below slit outer blade 40, or a side opposite to a side of slit outer blade 40 in contact with skin S). Slit inner blade 50 is detachably attached to one of the plurality of drive poles 13 (i.e., drive pole 13 different from the drive poles to which first inner blade 212 and the second inner blade are attached). When the power supply of electric razor 1 is turned on and drive pole 13 is driven in a state where slit inner blade 50 is disposed inside slit outer blade 40 and where slit inner blade 50 is attached to drive pole 13, slit inner blade 50 is displaced relative to slit outer blade 40 (i.e., is relatively moved, or reciprocates in the Y-direction) while being in sliding contact with inner surface 4112 (see FIG. 3) of slit outer blade 40.

As described above, electric razor 1 according to the present exemplary embodiment has a form of a reciprocating electric razor in which first inner blade 212, the second inner blade, and slit inner blade 50 are reciprocated with respect to first net blade 211, second net blade 221, and slit outer blade 40, respectively.

In the present exemplary embodiment, members of five blade blocks 30 other than two first inner blades 212 are attached to outer blade case 23 in a substantially frame shape. At this time, each of the members may be detachably attached to outer blade case 23, or may be attached to outer blade case 23 in a state of being undetachable.

In the present exemplary embodiment, two first net blades 211 are attached to outer blade case 23 in a state where first inner blades 212 are not disposed inward, and two second net blades 221 are attached to outer blade case 23 in a state where the second inner blades are disposed inward. One slit outer blade 40 is attached to outer blade case 23 in a state where slit inner blade 50 is disposed inward. At this time, at least one outer blade of two first net blades 211, two second net blades 221, and one slit outer blade 40 is preferably attached to outer blade case 23 so as to be floatable in the Z-direction (i.e., the up-down direction).

As described above, in the present exemplary embodiment, outer blade cassette 200 is formed by attaching two first net blades 211, two second blade blocks 22, and one slit blade block 30 to outer blade case 23. Outer blade cassette 200 is detachably attached to head cover 122.

Specifically, head cover 122 includes peripheral wall part 122*c* in a substantially tubular shape provided with upper opening 122*a* and lower opening 122*b*. Outer blade cassette 200 in which each of the outer blades faces upward is inserted from below lower opening 122*b* of head cover 122, and thus outer blade cassette 200 is attached to head cover 122. At this time, outer blade cassette 200 is attached to head cover 122 in a state where a surface of each outer blade is exposed from upper opening 122*a* of head cover 122. Thus, in the present exemplary embodiment, a part of the surface of each outer blade, the part being exposed from upper opening 122*a* of head cover 122, is skin contact surface 20*a* that comes into contact with skin S (i.e., a skin surface) of the user.

Release buttons 23*a* are provided on both left and right ends of outer blade case 23, and release buttons 23*a* are operated to release attachment between head cover 122 and outer blade cassette 200.

As described above, in the present exemplary embodiment, in a state two first inner blades 212 are attached to corresponding drive poles 13 protruding upward from head part body 121, head cover 122 to which outer blade cassette 200 has been attached is attached to head part body 121. In the state where two first inner blades 212 are attached to corresponding drive poles 13, when head cover 122 to which outer blade cassette 200 has been attached is attached to head part body 121, two first inner blades 212 are disposed inside corresponding first net blades 211.

In this way, each inner blade is displaced relative to the corresponding outer blade (i.e., relatively moved, or reciprocate in the Y-direction), when the power supply of electric razor 1 is turned on.

In a state where the power supply of electric razor 1 is turned on and each inner blade is displaced relative to the corresponding outer blade, skin contact surface 20*a* of blade unit 20 is brought into contact with skin S of the user (i.e., the skin surface) and is moved while being slid in the X-direction, thereby cutting whisker H (i.e., an example of body hair) inserted into the blade hole of each outer blade using the outer blade and the inner blade. When the outer blade is attached to outer blade case 23 in a state of being floatable in the Z-direction (i.e., the up-down direction), the outer blade floats with respect to razor body 10. Thus, outer blades (i.e., skin contact surface 20*a* of blade unit 20) can be more reliably brought into contact with skin S along a shape of the skin, so that whisker H (i.e., an example of body hair) can be more reliably cut.

Figure 3:
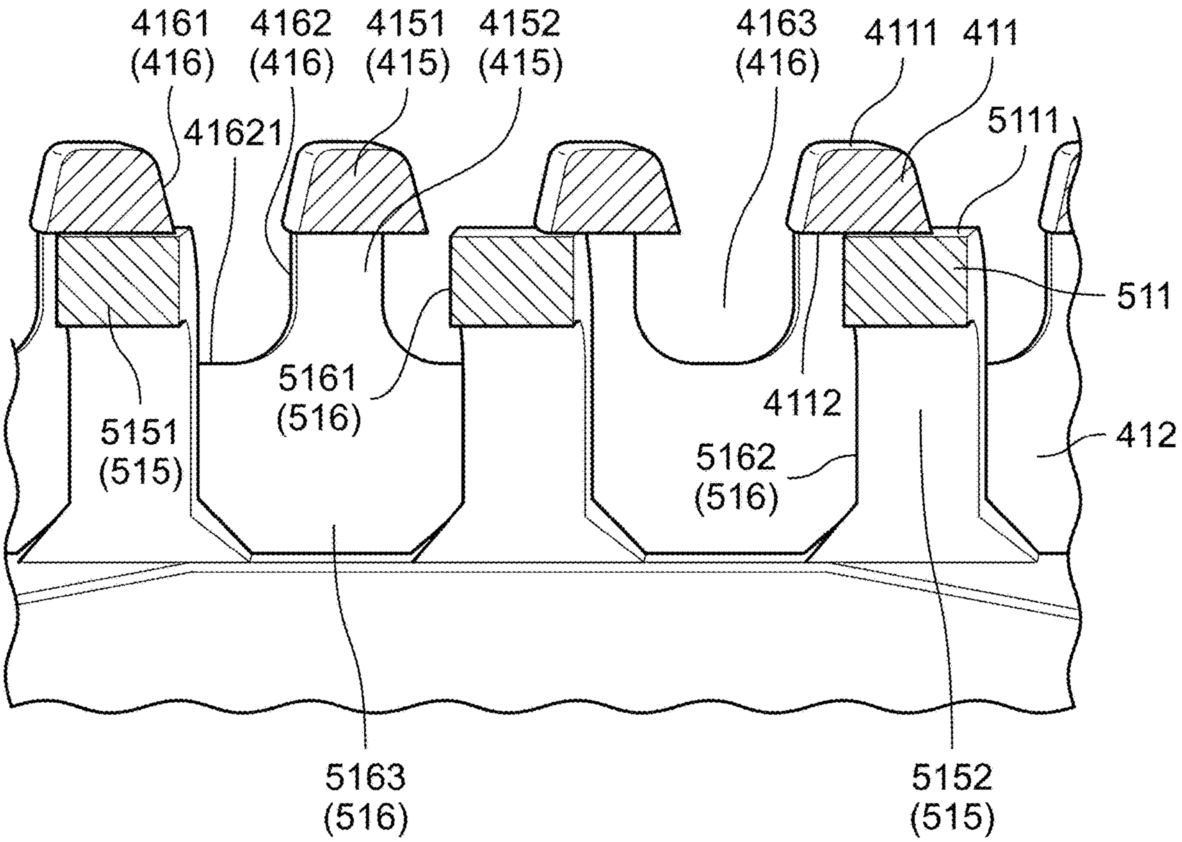
FIG. 3 is an enlarged cross-sectional view of a slit outer blade and a slit inner blade of the slit blade block according to the exemplary embodiment.
Figure 4:
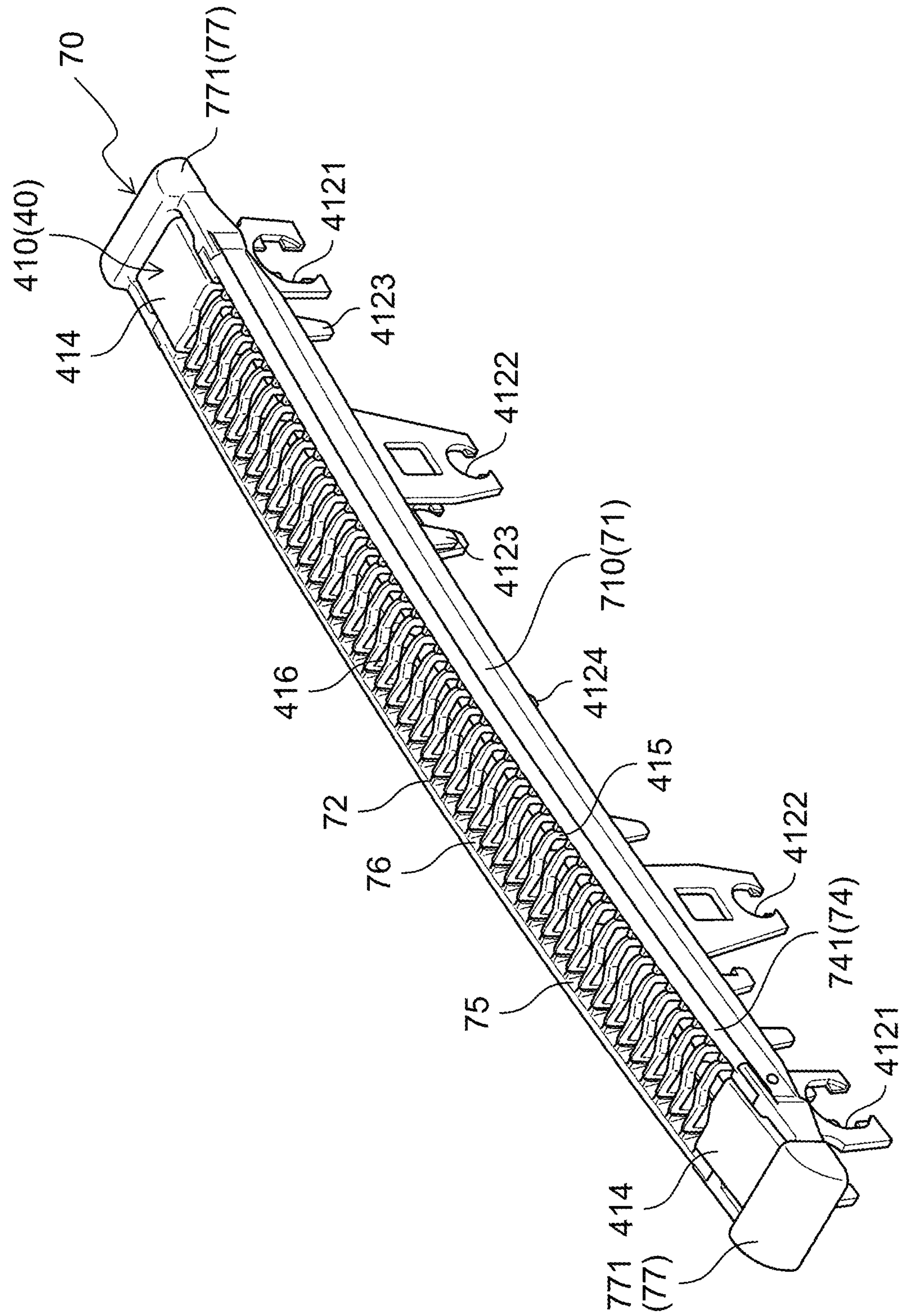
FIG. 4 is a perspective view illustrating a state where a slit outer blade body according to the exemplary embodiment is attached to a comb component.
Figure 5:
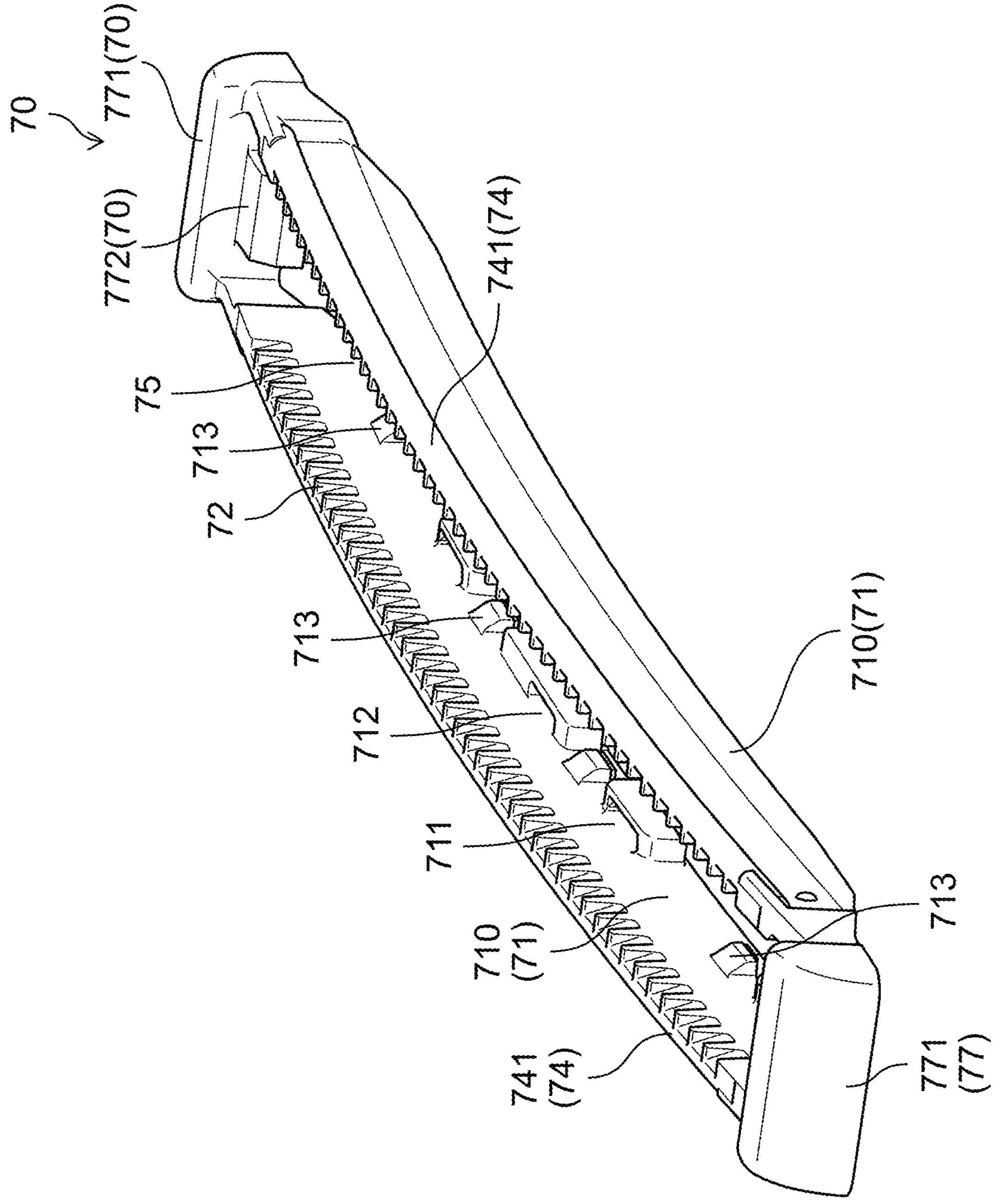
FIG. 5 is a perspective view illustrating the comb component according to the exemplary embodiment.
Figure 6:
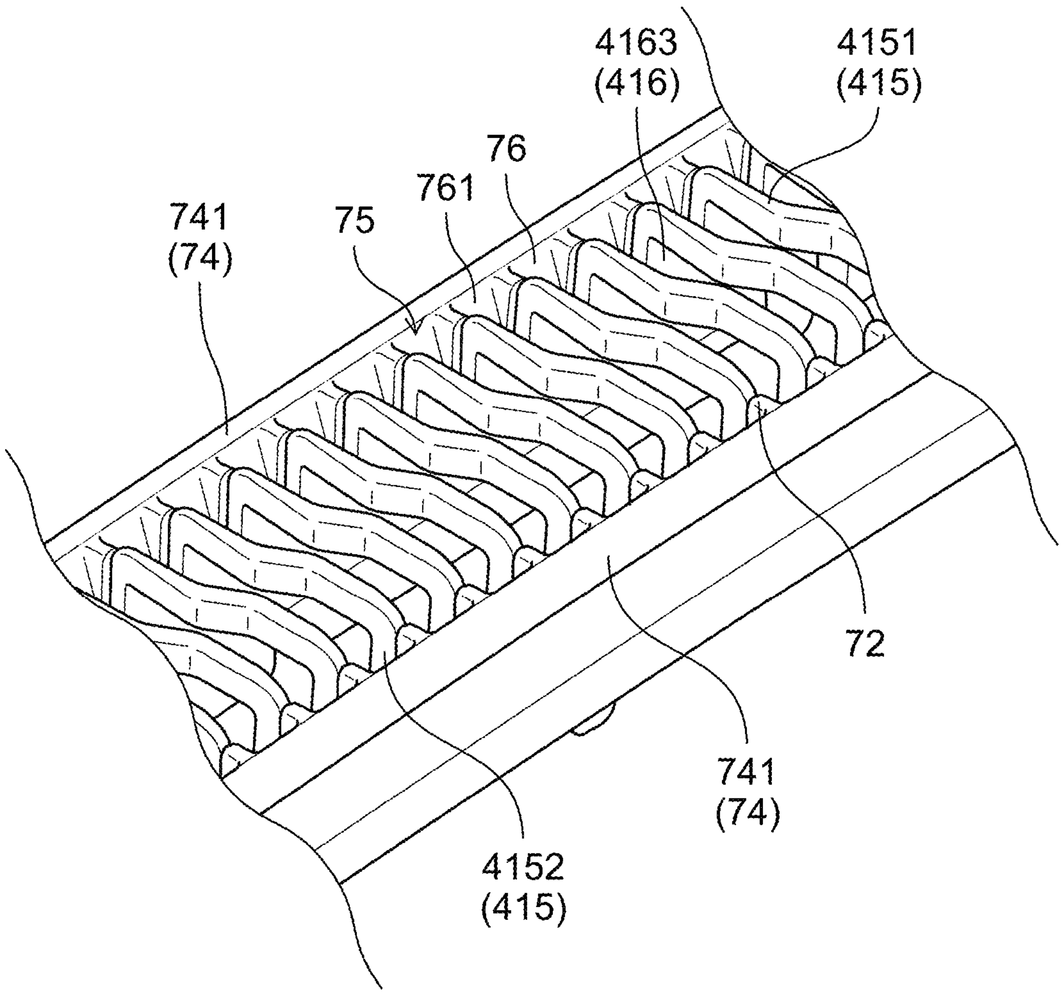
FIG. 6 is a partially enlarged perspective view illustrating a state where the slit outer blade body according to the exemplary embodiment is attached to the comb component.
Figure 7:
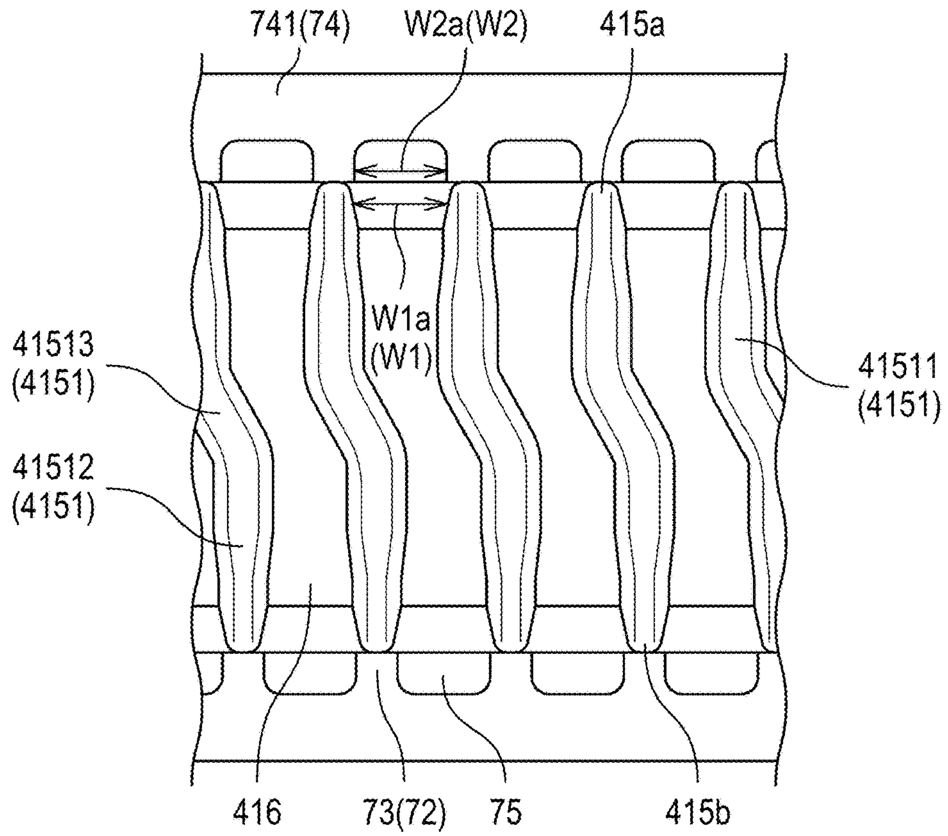
FIG. 7 is a partially enlarged plan view illustrating a state where the slit outer blade body according to the exemplary embodiment is attached to the comb component.

Next, a detailed configuration of slit blade block 30 will be described with reference to FIGS. 2 to 7. FIG. 2 is an exploded perspective view illustrating slit blade block 30 according to the exemplary embodiment. FIG. 3 is an enlarged cross-sectional view of slit outer blade 40 and slit inner blade 50 of slit blade block 30 according to the exemplary embodiment. FIG. 4 is a perspective view illustrating a state where slit outer blade body 410 according to the exemplary embodiment is attached to comb component 70. FIG. 5 is a perspective view illustrating comb component 70 according to the exemplary embodiment. FIG. 6 is a partially enlarged perspective view illustrating a state where slit outer blade body 410 according to the exemplary embodiment is attached to comb component 70. FIG. 7 is a partially enlarged plan view illustrating a state where slit outer blade body 410 according to the exemplary embodiment is attached to comb component 70.

Figure 2:
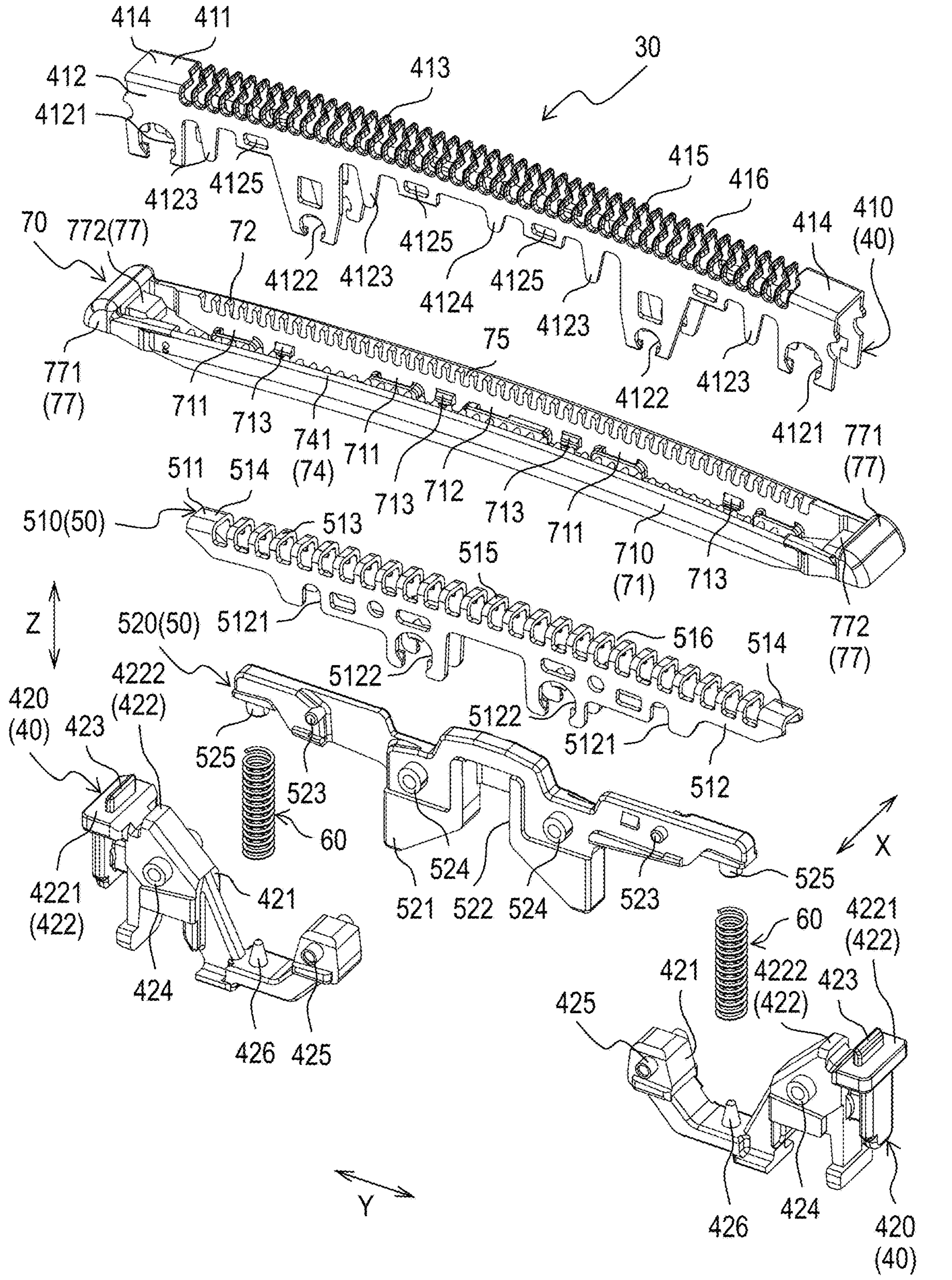
FIG. 2 is an exploded perspective view illustrating a slit blade block according to the exemplary embodiment.

As illustrated in FIG. 2, slit blade block 30 includes slit outer blade 40 and slit inner blade 50. Slit blade block 30 further includes a pair of coil springs 60, and slit outer blade 40 and slit inner blade 50 are connected by the pair of coil springs 60 in a state where slit inner blade 50 can reciprocally slide in the Y-direction with respect to slit outer blade 40.

In the present exemplary embodiment, slit outer blade 40 includes slit outer blade body 410 having a plurality of outer blade pieces 415, and outer blade joint 420 fixed to slit outer blade body 410 and connected to the pair of coil springs 60.

Similarly, slit inner blade 50 includes slit inner blade body 510 having a plurality of inner blade pieces 515, and inner blade joint 520 fixed to slit inner blade body 510 and connected to the pair of coil springs 60.

First, slit outer blade body 410 will be described.

For example, slit outer blade body 410 can be formed using a metal material, and is bent in an inverted U-shape so as to be convex upward in a side view (i.e., in a state viewed in the Y-direction). That is, slit outer blade body 410 includes top wall 411 (i.e., a first wall part) in the shape of a substantially rectangular plate elongated in the Y-direction, and a pair of side walls 412 (i.e., second wall parts) extending downward in the Z-direction from both ends of top wall 411 in the X-direction. An upper surface of top wall 411 (i.e., the first wall part) is skin contact surface 4111 (see FIG. 3) configured to come into contact with skin S of the user during use of electric razor 1.

The pair of side walls 412 are each provided with two first weld fixing parts 4121 and two second weld fixing parts 4122. That is, slit outer blade body 410 is provided with four first weld fixing parts 4121 and four second weld fixing parts 4122.

First weld fixing parts 4121 are provided at both ends of side wall 412 in the Y-direction so as to protrude downward in the Z-direction, and a cutout that is in a substantially circular shape open downward is provided at each of the central parts of first weld fixing parts 4121. Second weld fixing parts 4122 are provided at positions on side wall 412, the positions being inside first weld fixing parts 4121 in the Y-direction, so as to protrude downward in the Z-direction. In the present exemplary embodiment, second weld fixing parts 4122 are provided at respective positions below first weld fixing parts 4121 in the Z-direction, and a cutout that is in a substantially circular shape open downward is provided at each of the central parts of second weld fixing parts 4122.

Furthermore, in the present exemplary embodiment, the pair of side walls 412 are each provided with four first claw pieces 4123, one second claw piece 4124, and four fitting holes 4125. That is, slit outer blade body 410 is provided with eight first claw pieces 4123, two second claw pieces 4124, and eight fitting holes 4125.

First claw piece 4123 has a tapered shape with dimension in the Y-direction, the dimension decreasing downward in the Z-direction, and has a curved shape in front view (i.e., in a state viewed in the X-direction) in which a distal end (i.e., a lower end) is convex downward. Four first claw pieces 4123 are provided at the lower end of one of side walls 412 so as to protrude downward in a state of being spaced apart in the Y-direction. Specifically, two first claw pieces 4123 are provided so as to be positioned between first weld fixing part 4121 and second weld fixing part 4122 adjacent to each other in the Y-direction, and another two first claw pieces 4123 are provided between a pair of second weld fixing parts 4122 adjacent to each other in the Y-direction.

Second claw piece 4124 also has a tapered shape with dimension in the Y-direction, the dimension decreasing downward in the Z-direction, and has a curved shape in front view (i.e., in a state viewed in the X-direction) in which a distal end (i.e., a lower end) is convex downward. Second claw pieces 4124 are provided at the lower end of one of side walls 412 so as to protrude downward. In the present exemplary embodiment, one second claw piece 4124 is provided between two first claw pieces 4123 provided between the pair of second weld fixing parts 4122 adjacent to each other in the Y-direction in a state of being spaced apart from first claw pieces 4123 in the Y-direction. That is, one second claw piece 4124 is provided at the lower end of the central part of one of side walls 412 in the Y-direction. Second claw piece 4124 has a smaller dimension in the Z-direction than first claw piece 4123, and has a lower end provided so as to be located above a lower end of first claw piece 4123 in the Z-direction.

Fitting hole 4125 is in the shape of a rectangle elongated in the Y-direction in front view (i.e., in a state viewed in the X-direction), and is provided to penetrate in the X-direction.

Four fitting holes 4125 are provided at the lower end of one of side walls 412 in a state of being spaced apart in the Y-direction.

Specifically, each fitting hole 4125 is provided between first claw piece 4123 adjacent to first weld fixing part 4121 in the Y-direction and second weld fixing part 4122 adjacent to first claw piece 4123 in the Y-direction. Fitting hole 4125 constitutes two of four fitting holes 4125, the two being disposed at both ends in the Y-direction. Two fitting holes 4125 disposed at the both ends in the Y-direction are each provided in a projecting piece provided continuously to an outer side of a projecting piece provided with second weld fixing part 4122 in the Y-direction.

Each fitting hole 4125 is provided between first claw piece 4123 and second claw piece 4124 adjacent to each other in the Y-direction. Fitting hole 4125 constitutes two of four fitting holes 4125, the two being disposed inside in the Y-direction. Two fitting holes 4125 disposed inside in the Y-direction protrude from the lower end of one of side walls 412, and are each provided in a projecting piece in the shape of a rectangle elongated in the Y-direction in front view (i.e., in a state viewed in the X-direction).

Slit outer blade body 410 includes slit outer blade part 413 having outer blade pieces 415 and outer slits 416, and coupling parts 414 coupled to respective ends of slit outer blade part 413 in the Y-direction.

Slit outer blade part 413 is provided with a plurality of outer blade pieces 415 so as to be spaced apart from each other in the Y-direction in a state of extending in the X-direction. In the present exemplary embodiment, the plurality of outer blade pieces 415 is provided so as to be aligned at substantially equal intervals with a predetermined pitch (i.e., a predetermined interval) in the Y-direction. In the present exemplary embodiment, each of the plurality of outer blade pieces 415 extends from one side wall 412 to the other side wall 412 through top wall 411 in a substantially flat shape, and is bent into an inverted U-shape so as to be convex upward in side view (i.e., in a state viewed in the Y-direction). That is, as illustrated in FIG. 3, outer blade pieces 415 each include upper outer blade piece 4151 provided on top wall 411, and a pair of lateral outer blade pieces 4152 provided on side walls 412 and coupled to an end of upper outer blade piece 4151 in the X-direction.

As illustrated in FIGS. 2 and 3, outer slit 416 extending in the X-direction is provided along outer blade pieces 415 between outer blade pieces 415 adjacent in the Y-direction. Thus, in the present exemplary embodiment, outer slit 416 includes outer upper slit 4161 (i.e., a first slit) defined by upper outer blade pieces 4151 adjacent in the Y-direction, and a pair of outer lateral slits 4162 (i.e., second slits) defined by lateral outer blade pieces 4152 adjacent in the Y-direction. As described above, in the present exemplary embodiment, both ends of outer slit 416 in the X-direction are provided in respective side walls 412.

Furthermore, in the present exemplary embodiment, as illustrated in FIG. 3, the pair of outer lateral slits 4162 (i.e., the second slits) communicate with each other through outer internal space 4163, and thus outer slit 416 also includes outer internal space 4163. In this way, outer slit 416 is configured to be open not only upward but also on both sides in the X-direction, and thus outer slit 416 passing through from one end to the other end in the X-direction above lower end 41621 of lateral slit (i.e., the second slit) 4162 is provided. That is, outer slit 416 is provided from one end to the other end of slit outer blade 40 in the X-direction without being divided halfway.

In this way, even a relatively long whisker H (i.e., an example of body hair) can be more easily introduced into outer slit 416. Additionally, resistance (e.g., frictional force and the like) caused by whisker H (i.e., an example of body hair) caught on outer blade pieces 415, for example, is prevented from increasing, so that deterioration of shaving comfort can also be suppressed. As described above, outer slit 416 has a function of introducing long whisker H (i.e., an example of body hair) into slit outer blade 40.

Slit outer blade body 410 described above can be formed by pressing a single metal flat plate material. Specifically, a plurality of elongated slits is first bored in one metal flat plate material to be disposed side by side at a predetermined interval, so that a part to be an outer blade piece is provided in a remaining part of the one metal flat plate material existing between the slits adjacent to each other. At this time, the one metal flat plate material is punched so as to also form a through-hole, a cutout, a projecting piece, and the like.

Then, insides of both ends of the slit in the metal plate material in the front-back direction (i.e., a slit length direction) are bent in one direction. As a result, slit outer blade body 410 including top wall 411 and the pair of side walls 412 is provided.

Slit outer blade body 410 may be in a shape in which an upper part of a bent part is bent at an acute angle, or the bent part is bent at a substantially right angle (i.e., about) 90°. In the present exemplary embodiment, slit outer blade body 410 in which a bent part is bent at a substantially right angle (i.e., about) 90° is exemplified.

Next, outer blade joint 420 will be described.

Outer blade joint 420 can be formed by injection molding using a resin material, for example. Outer blade joint 420 includes a pair of joint bodies 421 identical in shape, and the pair of joint bodies 421 are symmetrically disposed right and left and are spaced apart from each other in the Y-direction.

In the present exemplary embodiment, as illustrated in FIG. 2, each joint body 421 includes mount part 422 on which comb component 70, which will be described later, is mounted. Mount part 422 has a substantially T-shape in plan view, and is provided at an upper end part of each joint body 421, the upper end part being located outside in the Y-direction. In the present exemplary embodiment, mount part 422 includes outward part 4221 and inward part 4222, and outward part 4221 is provided outside inward part 4222 in the Y-direction so as to be continuous with inward part 4222. Outward part 4221 is provided so as to have a dimension in the X-direction that is larger than a dimension of inward part 4222 in the X-direction.

Outward part 4221 is provided with protrusion 423 protruding upward in the Z-direction. In the present exemplary embodiment, protrusion 423 having a rectangular shape with a dimension in the X-direction that is larger than a dimension in the Y-direction in plan view is provided at the central part of outward part 4221.

One first weld part 424 and one second weld part 425 that protrude in the X-direction are provided at respective ends in the X-direction of joint body 421. That is, outer blade joint 420 is provided with four first weld parts 424 and four second weld parts 425. Each of two first weld parts 424 provided in one joint body 421 has a substantially cylindrical shape, and is provided inside inward part 4222 of joint body 421 in the Y-direction. Two first weld parts 424 are provided on one joint body 421 so as to overlap with each other in front view (i.e., in a state viewed in the X-direction).

Each of two second weld parts 425 provided in one joint body 421 has a substantially cylindrical shape, and is provided at an end part opposite (i.e., inside outer blade joint 420 in the Y-direction.) to mount part 422 of joint body 421 in the Y-direction. Two second weld parts 425 are also provided on one joint body 421 so as to overlap with each other in front view (i.e., in a state viewed in the X-direction).

When outer blade joint 420 is fixed to slit outer blade body 410, first weld part 424 is inserted into the cutout in a substantially circular shape of first weld fixing part 4121, and second weld part 425 is inserted into the cutout in a substantially circular shape of second weld fixing part 4122. Thus, in the present exemplary embodiment, second weld part 425 is provided at a position below first weld part 424 in the Z-direction.

In a state where first weld part 424 is inserted into the cutout in a substantially circular shape of first weld fixing part 4121 and where second weld part 425 is inserted into the cutout in a substantially circular shape of second weld fixing part 4122, heat sealing is performed to cause weld first weld part 424 to be welded to first weld fixing part 4121 while causing second weld part 425 to be welded to second weld fixing part 4122. In this way, outer blade joint 420 is fixed to slit outer blade body 410 to form slit outer blade 40.

Furthermore, in the present exemplary embodiment, joint body 421 is provided with spring mount part 426 protruding upward in the Z-direction, and slit outer blade 40 is coupled to coil spring 60 by inserting spring mount part 426 into a lower end of coil spring 60.

Spring mount part 426 has a substantially truncated conical shape, and is provided at a position between first weld part 424 and second weld part 425 in the Y-direction. Furthermore, in the present exemplary embodiment, spring mount part 426 is provided at a position below second weld part 425 in the Z-direction.

Next, slit inner blade body 510 will be described.

Similarly to slit outer blade body 410, slit inner blade body 510 can be formed using a metal material or the like, and is bent in an inverted U-shape so as to be convex upward in a side view (i.e., in a state viewed in the Y-direction). That is, slit inner blade body 510 includes top wall 511 in the shape of a substantially rectangular plate elongated in the Y-direction, and a pair of side walls 512 extending downward in the Z-direction from both ends of top wall 511 in the X-direction. As illustrated in FIG. 3, slit inner blade body 510 is disposed inside slit outer blade body 410 in a state where upper surface 5111 of top wall 511 can be in sliding contact with inner surface 4112 of top wall 411.

The pair of side walls 512 are each provided with two positioning parts 5121 and two weld fixing parts 5122.

Positioning parts 5121 are provided on opposite sides across side wall 512 in the Y-direction so as to protrude downward in the Z-direction, and a cutout that is in a substantially concave shape open downward is provided at each of the central parts of positioning parts 5121. Weld fixing parts 5122 are each provided at a position on side wall 512, the position being inside positioning parts 5121 in the Y-direction, so as to protrude downward in the Z-direction. In the present exemplary embodiment, weld fixing parts 5122 are provided so as to be positioned below positioning parts 5121 in the Z-direction, and a cutout that is in a substantially circular shape open downward is provided at each of the central parts of weld fixing parts 5122.

Slit inner blade body 510 includes slit inner blade part 513 having inner blade pieces 515 and inner slit 516, and coupling parts 514 coupled to respective ends of slit inner blade part 513 in the Y-direction.

Slit inner blade part 513 is provided with a plurality of inner blade pieces 515 extending in the X-direction and being spaced apart from each other in the Y-direction. In the present exemplary embodiment, the plurality of inner blade pieces 515 is provided so as to be aligned at substantially equal intervals with a predetermined pitch (i.e., a predetermined interval) in the Y-direction. In the present exemplary embodiment, each of the plurality of inner blade pieces 515 extends from one side wall 512 to the other side wall 512 through top wall 511 in a substantially flat shape, and is bent into an inverted U-shape so as to be convex upward in side view (i.e., in a state viewed in the Y-direction). That is, as illustrated in FIG. 3, inner blade pieces 515 each include upper inner blade piece 5151 provided on top wall 511, and a pair of lateral inner blade pieces 5152 provided on side walls 512 and coupled to an end of upper inner blade piece 5151 in the X-direction.

Inner slit 516 extending in the X-direction is provided along inner blade pieces 515 between inner blade pieces 515 adjacent to each other in the Y-direction. Thus, in the present exemplary embodiment, inner slit 516 includes inner upper slit 5161 defined by upper inner blade pieces 5151 adjacent in the Y-direction, and a pair of inner lateral slits 5162 defined by lateral inner blade pieces 5152 adjacent in the Y-direction. Furthermore, in the present exemplary embodiment, the pair of inner lateral slits 5162 communicate with each other through inner internal space 5163, and thus inner slit 516 also includes inner internal space 5163. In this way, inner slit 516 opens not only upward but also on both sides in the X-direction, and thus inner slit 516 passing through from one end to the other end in the X-direction above a lower end of inner lateral slit 5162 is provided. That is, inner slit 516 is provided from one end to the other end of slit inner blade 50 in the X-direction without being divided halfway.

In this way, whisker H (i.e., an example of body hair) introduced laterally from outer slit 416 can be more reliably prevented from interfering with side wall 512. As described above, inner slit 516 has a function of introducing a part to be cut of long whisker H (i.e., an example of body hair) into slit inner blade 50.

Slit inner blade body 510 described above also can be formed by pressing a single metal flat plate material. Specifically, a plurality of elongated slits is first bored in one metal flat plate material to be disposed side by side at a predetermined interval, so that a part to be an inner blade piece is provided in a remaining part of the one metal flat plate material existing between the slits adjacent to each other. At this time, the one metal flat plate material is punched so as to also form a through-hole, a cutout, a projecting piece, and the like.

Then, insides of both ends of the slit in the metal plate material in the front-back direction (i.e., a slit length direction) are bent in one direction. In this way, slit inner blade body 510 including top wall 511 and the pair of side walls 512 is provided.

Slit inner blade body 510 may be in a shape in which an upper part of a bent part is bent at an acute angle, or the bent part is bent at a substantially right angle (i.e., about 90°). In the present exemplary embodiment, slit inner blade body 510 in which a bent part is bent at a substantially right angle (i.e., about 90°) is exemplified.

Next, inner blade joint 520 will be described.

Inner blade joint 520 can be formed by injection molding using a resin material, for example, and includes joint body 521 as illustrated in FIG. 2.

Joint body 521 has an elongated shape in the Y-direction, and fitting recess 522 to which drive pole 13 is detachably fitted is provided at the center part of the joint body 521 in the Y-direction so as to open downward in the Z-direction.

Two positioning parts 523 and two weld parts 524 that protrude in the X-direction are provided on respective sides of joint body 521 in the X-direction. That is, inner blade joint 520 is provided with four positioning parts 523 and four weld parts 524.

Two positioning portions 523 are provided on one side of the joint body 521 in the X-direction between the Y-direction end of the joint body 521 and the fitting recess 522 so as to protrude to the one side in the X-direction. Two positioning portions 523 are also provided on the other side in the X-direction of the joint body 521 between the Y-direction end of the joint body 521 and the fitting recess 522 so as to protrude toward the other side in the X-direction. In the present exemplary embodiment, four positioning parts 523 each have a substantially columnar shape, and two positioning parts 523 on the one side of joint body 521 in the X-direction are provided so as to overlap with two respective positioning parts 523 provided on the other side of joint body 521 in the X-direction in front view (i.e., in a state viewed in the X-direction).

Similarly, two welded portions 524 are provided on the one side of the joint body 521 in the X-direction between the positioning portion 523 and the fitting recess 522 so as to protrude to the one side in the X-direction. In addition, two welded portions 524 are also provided on the other side of the joint body 521 in the X-direction between the positioning portion 523 and the fitting recess 522 so as to protrude to the other side in the X-direction. In the present exemplary embodiment, four weld parts 524 each have a substantially cylindrical shape, and two weld parts 524 on the one side of joint body 521 in the X-direction are provided so as to overlap with two respective weld parts 524 provided on the other side of joint body 521 in the X-direction in front view (i.e., in a state viewed in the X-direction).

When inner blade joint 520 is fixed to slit inner blade body 510, positioning part 523 is inserted into the cutout in a substantially concave shape of positioning part 5121, and weld part 524 is inserted into the cutout in a substantially circular shape of weld fixing part 5122. Thus, in the present exemplary embodiment, positioning part 523 is provided so as to be positioned above weld part 524 in the Z-direction.

In a state where positioning part 523 is inserted into the cutout in a substantially concave shape of positioning part 5121 and where weld part 524 is inserted into the cutout in a substantially circular shape of weld fixing part 5122, heat sealing is performed to cause weld part 524 to be welded to weld fixing part 5122 in a state where weld part 524 is positioned by positioning part 523 and positioning part 5121. In this way, inner blade joint 520 is fixed to slit inner blade body 510 to form slit inner blade 50.

Furthermore, in the present exemplary embodiment, joint body 521 is provided with spring mount part 525 protruding upward in the Z-direction, and slit inner blade 50 is coupled to coil spring 60 by inserting spring mount part 525 into an upper end of coil spring 60.

Spring mount part 525 has a substantially columnar shape and is provided at both ends of joint body 521 in the Y-direction.

Slit blade block 30 is intended for rough shaving to shorten whisker H (i.e., an example of body hair) that is long to some extent. Slit blade block 30 described above is preferably improved in introduction properties of whisker H (i.e., an example of body hair) into outer slit 416.

To improve the introduction properties of whisker H (i.e., an example of body hair) into outer slit 416, increase in an interval between outer blade pieces 415 of slit outer blade 40 is conceivable. However, the increase in the interval between outer blade pieces 415 of slit outer blade 40 causes a problem that stimulation to skin S increases, and a problem that slit outer blade 40 decreases in strength due to decrease in width of each outer blade piece 415.

In view of this, in the present exemplary embodiment, slit blade block 30 includes comb component 70 including a plurality of combs 72 that are provided outside slit outer blade 40 in the X-direction, and the plurality of combs 72 are spaced apart from each other in the Y-direction. A groove 75 which communicates with outer slit 416 is provided between two adjacent combs 72 in the Y-direction, and comb component 70 is provided with protrusion 74 protruding outward in the X-direction.

This improves the introduction propertied of whisker H (i.e., an example of body hair) into outer slit 416 without changing a size of the interval between outer blade pieces 415 of slit outer blade 40. Specifically, when electric razor 1 is in use, an apex of protrusion 74 provided on comb component 70 is inserted between skin S and long whisker H (i.e., an example of body hair) lying on skin S. Long whisker H (i.e., an example of body hair) is caused to ride on the apex of protrusion 74, and long whisker H (i.e., an example of body hair) is moved along a surface of protrusion 74 along with movement of comb 72, so that whisker H (i.e., an example of body hair) is raised, and is introduced from groove 75 into outer slit 416 in a state of being raised.

In the present exemplary embodiment, comb component 70 in which combs 72 are provided is provided separately from slit outer blade 40. As illustrated in FIG. 4, when comb component 70 is attached to slit outer blade 40, the plurality of combs 72 are spaced apart from each other in the Y-direction outside slit outer blade 40 in the X-direction.

Comb component 70 can be formed by injection molding using a resin material, for example, and has lower rigidity than slit outer blade 40. Comb component 70 has a substantially frame shape open in the Z-direction, and is formed by being slightly curved in the Y-direction (i.e., outer blade length direction) so as to be convex upward in front view (i.e., in a state viewed in the X-direction). Comb component 70 may also be provided without being curved so as to be convex upward in front view. For example, when comb component 70 is viewed from the front (i.e., in a state viewed in the X-direction), an apex of comb component 70 (i.e., an upper end of comb support wall 71, which will be described later) may be a straight line extending in the Y-direction (i.e., outer blade length direction).

As illustrated in FIG. 5, comb component 70 includes a pair of comb support walls 71 extending in the Y-direction and the Z-direction and facing each other in the X-direction. Comb component 70 also includes a pair of comb end walls 77 extending in the X-direction and the Z-direction and facing each other in the Y-direction, and the pair of comb end walls 77 is connected to respective ends of the pair of comb support walls 71 in the Y-direction.

Each of the pair of comb support walls 71 includes support wall body 710, and the plurality of combs 72 are provided at the upper end of each support wall body 710 so as to protrude upward and be spaced apart from each other in the Y-direction. Thus, in the present exemplary embodiment, two rows of combs 72 spaced apart in the Y-direction are juxtaposed in the X-direction.

Each support wall body 710 is provided in its inner side in the X-direction (i.e., sides facing each other) with four first through-holes 711 open in the Z-direction, one second through-hole 712 open in the Z-direction, and four fitting protrusions 713 protruding inward in the X-direction. That is, comb component 70 is provided with eight first through-holes 711, two second through-holes 712, and eight fitting protrusions 713.

In the present exemplary embodiment, eight first through-holes 711 are provided at respective positions corresponding to eight first claw pieces 4123 provided in slit outer blade body 410. When slit outer blade body 410 is inserted and attached to comb component 70 in a substantially frame shape from above, eight first claw pieces 4123 are inserted into respective eight first through-holes 711.

Two second through-holes 712 are provided at respective positions corresponding to two second claw pieces 4124 provided in slit outer blade body 410. When slit outer blade body 410 is inserted and attached to comb component 70 in a substantially frame shape from above, two second claw pieces 4124 are inserted into two respective second through-holes 712.

Eight fitting protrusions 713 are provided at respective positions corresponding to eight fitting holes 4125 provided in slit outer blade body 410. When slit outer blade body 410 is inserted and attached to comb component 70 in a substantially frame shape from above, eight fitting protrusions 713 are fitted into eight respective fitting holes 4125.

As described above, in the present exemplary embodiment, slit outer blade body 410 is attached to comb component 70 by fitting eight fitting protrusions 713 into eight respective fitting holes 4125.

Each comb end wall 77 includes end wall body 771 that comes into contact with an upper surface of mount part 422 of outer blade joint 420 when slit blade block 30 is assembled. In the present exemplary embodiment, end wall body 771 has a curved shape inclined downward and outward in the Y-direction in front view (i.e., in a state viewed in the X-direction), and a lower end of end wall body 771 is a flat surface extending substantially horizontally. A housing (not illustrated) in which protrusion 423 provided on mount part 422 is housed when slit blade block 30 is assembled is provided at the lower end of end wall body 771.

Furthermore, each comb end wall 77 further includes protrusion 772 that protrudes inward in the Y-direction from an inner surface of end wall body 771 in the Y-direction and comes into contact with the upper surface of mount part 422 of outer blade joint 420 when slit blade block 30 is assembled. In the present exemplary embodiment, protrusion 772 has a substantially quadrangular shape in plan view (i.e., in a state viewed in the Z-direction), and has an upper surface that is a flat surface extending substantially horizontally. When slit outer blade body 410 is attached to comb component 70, coupling part 414 (i.e., an outward end part of top wall 411 in the Y-direction) of slit outer blade body 410 is placed on the upper surface of protrusion 772.

As described above, in the present exemplary embodiment, protrusion 772 of comb component 70 is sandwiched between slit outer blade body 410 and outer blade joint 420 when slit blade block 30 is assembled.

Thus, when slit blade block 30 is assembled, comb component 70 is attached to slit outer blade 40 in a state where relative movement in the Z-direction and the Y-direction with respect to slit outer blade body 410 and outer blade joint 420 is restricted.

As illustrated in FIG. 7, comb 72 includes support part 73 provided so as to protrude upward on an upper end of support wall body 710. Protrusion 74 provided so as to protrude outward in the X-direction is provided at the upper end of support part 73. As described above, in the present exemplary embodiment, comb 72 includes support part 73 provided so as to protrude upward on the upper end of support wall body 710, and protrusion 74 provided so as to protrude outward in the X-direction on the upper end of support part 73.

Furthermore, in the present exemplary embodiment, as illustrated in FIGS. 5 to 7, protrusion 74 is provided so as to have a shape curved so as to be convex outward in the X-direction (i.e., the first direction) when viewed in the Y-direction (i.e., the second direction). In this way, the curved part of protrusion 74 is allowed to be brought into contact with skin S of the user when whisker H (i.e., an example of body hair) is shaved, and thus further reduces stimulation applied to skin S.

Here, in the present exemplary embodiment, combs 72 have a placement pitch that is substantially equal to a placement pitch of outer blade pieces 415, and each of combs 72 is adjacent to corresponding one of outer blade pieces 415 in the X-direction when slit outer blade body 410 is attached to comb component 70. In this way, groove 75 provided between combs 72 adjacent in the Y-direction communicates with outer slit 416, and groove 75 has a function of introducing long whisker H (i.e., an example of body hair) into outer slit 416 provided in slit outer blade body 410.

Slit blade block 30 is formed by assembling and integrating slit outer blade body 410, outer blade joint 420, slit inner blade body 510, inner blade joint 520, coil spring 60, and comb component 70, each of which has a shape described above.

Hereinafter, an example of a method for assembling slit blade block 30 will be described.

First, slit inner blade body 510 is fixed to inner blade joint 520 to form slit inner blade 50. Specifically, in a state where positioning part 523 is inserted into the cutout in a substantially concave shape of positioning part 5121 and where weld part 524 is inserted into the cutout in a substantially circular shape of weld fixing part 5122, heat sealing is performed to cause weld part 524 to be welded to weld fixing part 5122 in a state where positioning is performed by positioning part 523 and positioning part 5121. In this way, inner blade joint 520 is fixed to slit inner blade body 510 to form slit inner blade 50.

Next, spring mount parts 426 of the pair of joint bodies 421 provided in outer blade joint 420 are inserted into respective lower ends of corresponding coil springs 60 to connect outer blade joint 420 to coil springs 60. This step may be performed before or simultaneously with a step of forming slit inner blade 50.

Next, a pair of spring mount parts 525 provided on slit inner blade 50 are inserted into respective upper ends of corresponding coil springs 60 to couple slit inner blade 50 to coil springs 60.

Next, slit outer blade body 410 is inserted into comb component 70 from above to be attached to comb component 70. This step can be performed simultaneously with at least one of the steps described above, or can be performed before at least one of the steps described above.

In a state where slit outer blade body 410 is attached to comb component 70, and where outer blade joint 420 and slit inner blade 50 are coupled to coil springs 60, slit outer blade body 410 is fixed to outer blade joint 420 to form slit outer blade 40. Specifically, in a state where first weld part 424 is inserted into the cutout in a substantially circular shape of first weld fixing part 4121 and where second weld part 425 is inserted into the cutout in a substantially circular shape of second weld fixing part 4122, heat sealing is performed to cause weld first weld part 424 to be welded to first weld fixing part 4121 and to cause second weld part 425 to be welded to second weld fixing part 4122. In this way, outer blade joint 420 is fixed to slit outer blade body 410 to form slit outer blade 40.

The steps describe above are performed to assemble slit outer blade body 410, outer blade joint 420, slit inner blade body 510, inner blade joint 520, coil springs 60, and comb component 70, slit blade block 30 in which slit inner blade body 510 is integrated and mounted so as to be reciprocatable along slit outer blade body 410 can be provided.

At this time, inner blade joint 520 and outer blade joint 420 maintain coil springs 60 in a compressed state. In this way, upper surface 5111 of top wall 511 of slit inner blade body 510 is in elastic contact with inner surface 4112 of top wall 411 of slit outer blade body 410 using coil springs 60.

As described above, in slit blade block 30 according to the present exemplary embodiment, slit inner blade 50 is housed inside slit outer blade body 410 in a state of being slidable in the Y-direction and of causing upper surface 5111 of slit inner blade body 510 to be in elastic contact with inner surface 4112 of slit outer blade body 410. This ensures good cutting quality of whisker H (i.e., an example of body hair) cut on sliding surfaces (i.e., inner surface 4112 and upper surface 5111) of slit outer blade 40 and slit inner blade 50.

In the present exemplary embodiment, stimulation applied to skin S during use of electric razor 1 can be more reliably suppressed.

Specifically, protrusion 74 provided so as to protrude outward in the X-direction from the upper end of support part 73 includes first protrusion 741 extending across two or more support parts 73 (i.e., one element of comb 72) disposed side by side in the Y-direction (i.e., the second direction). That is, support part 73 (i.e., one element of comb 72) is provided with first protrusion 741 having a large width in the Y-direction (i.e., the second direction).

This allows first protrusion 741 having a large width in the Y-direction (i.e., the second direction) to be brought into contact with skin S of the user when whisker H (i.e., body hair) is shaved, and thus further reduces stimulation applied to skin S.

In the present exemplary embodiment, one first protrusion 741 elongated so as to extend from comb 72 located at one end in the Y-direction (i.e., the second direction) to comb 72 located at the other end in the Y-direction (i.e., the second direction) is provided on each of both sides of comb component 70 in the X-direction. That is, first protrusion 741 is provided so as to extend from comb 72 located at the one end in the Y-direction (i.e., the second direction) to comb 72 located at the other end in the Y-direction (i.e., the second direction).

This allows skin S to be more reliably prevented from coming into contact with outer blade pieces 415 when whisker H (i.e., an example of body hair) is shaved, and thus further reduces stimulation applied to skin S.

In the present exemplary embodiment, positions in the Y-direction (i.e., the second direction) of groove 75 and outer slit 416 which communicate with each other are the same as each other. This allows whisker H (i.e., an example of body hair) introduced into groove 75 to be more reliably prevented from being stepped on by outer blade pieces 415 of slit outer blade 40 and failing to be cut when whisker H (i.e., an example of body hair) is shaved.

In the present exemplary embodiment, as illustrated in FIG. 7, groove 75 is provided such that width W2 in the Y-direction (i.e., the second direction) is substantially constant, and outer slit 416 is provided such that width W1 in the Y-direction (i.e., the second direction) is substantially constant. Width W2 of groove 75 in the Y-direction (i.e., the second direction) is equal to width W1 of outer slit 416 in the Y-direction (i.e., the second direction).

Thus, in the present exemplary embodiment, width W2*a* of groove 75 in the Y-direction (i.e., the second direction) on a side close to outer slit 416 is equal to width W1*a* of outer slit 416 in the Y-direction (i.e., the second direction) on a side close to groove 75.

Groove 75 and outer slit 416 communicate with each other in a state of having not only one ends in the Y-direction (i.e., the second direction) located at respective positions aligned in front view (i.e., in a state viewed in the X-direction) but also the other ends in the Y-direction (i.e., the second direction) located at respective positions aligned in the front view.

This allows whisker H (i.e., an example of body hair) introduced into groove 75 to be more efficiently introduced into outer slit 416.

In the present exemplary embodiment, upper outer blade piece 4151 includes first piece part 41511 disposed on one side in the X-direction and extending in the X-direction, and second piece part 41512 disposed on the other side in the X-direction at a position shifted from first piece part 41511 in the Y-direction and extending in the X-direction. Upper outer blade piece 4151 includes coupling piece part 41513 that extends in an oblique direction intersecting the X-direction and that couples first piece part 41511 and second piece part 41512.

That is, outer blade piece 415 has a shape such that one end **415*a* and the other end 415*b* in the X-direction (i.e., the first direction) are shifted from each other in the Y-direction (i.e., the second direction). As described above, in the present exemplary embodiment, outer blade piece 415 at one end and outer blade piece 415** at the other end in the X-direction (i.e., the first direction) are shifted from each other in the Y-direction (i.e., the second direction).

Thus, in the present exemplary embodiment, outer slit 416 defined by outer blade pieces 415 adjacent to each other in the Y-direction also has a shape such that one end and the other end in the X-direction (i.e., the first direction) are shifted from each other in the Y-direction (i.e., the second direction).

In this way, whisker H (i.e., an example of body hair) which has been stepped on by outer blade piece 415 during movement in the one direction and has not been introduced into outer slit 416 is allowed to be introduced into outer slit 416 during movement in the other direction, when whisker H (i.e., an example of body hair) is shaved during reciprocation in the X-direction (i.e., the first direction). That is, when whisker H (i.e., an example of body hair) is shaved during the reciprocation in the X-direction (i.e., the first direction), whisker H (i.e., an example of body hair) can be shaved more efficiently.

In the present exemplary embodiment, combs 72 on one side in the X-direction (i.e., the first direction) are provided such that the positions thereof in the Y-direction (i.e., the second direction) are the same as that of one end **415*a* of outer blade piece 415 in the X-direction (i.e., the first direction). Combs 72 on the other side in the X-direction (i.e., the first direction) are provided such that the positions thereof in the Y-direction (i.e., the second direction) is the same that of the other end 415*b* of outer blade piece 415** in the X- direction (i.e., the first direction).

Thus, in the present exemplary embodiment, groove 75 communicating with one outer slit 416 is also provided at positions on one end side and the other end side in the X-direction (i.e., the first direction), the positions being shifted in the Y-direction (i.e., the second direction). This allows whisker H (i.e., an example of body hair) introduced into groove 75 to be more efficiently introduced into outer slit 416.

Figure 8:
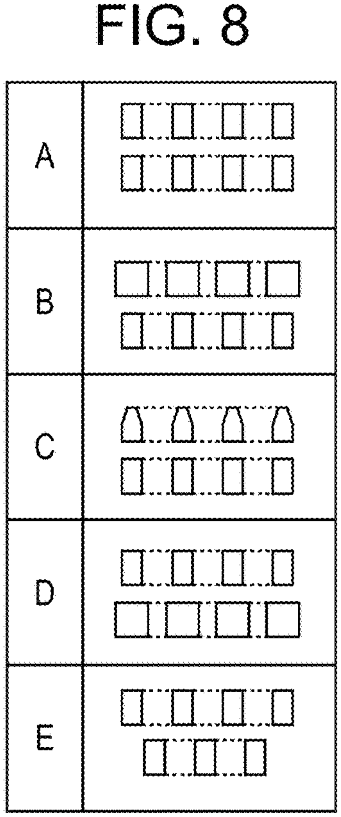
FIG. 8 is a diagram schematically illustrating a plurality of examples of a placement pattern of slits of slit outer blades and grooves of comb components in the exemplary embodiment.
Figure 9:
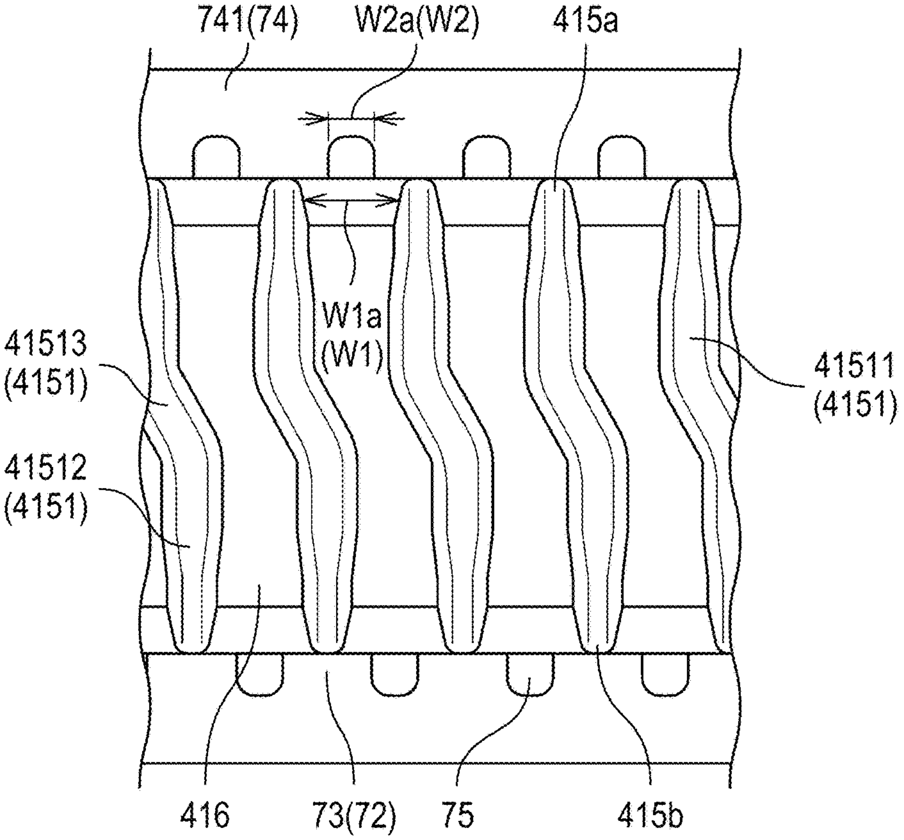
FIG. 9 is a plan view illustrating a specific configuration of pattern B illustrated in FIG. 8.
Figure 10:
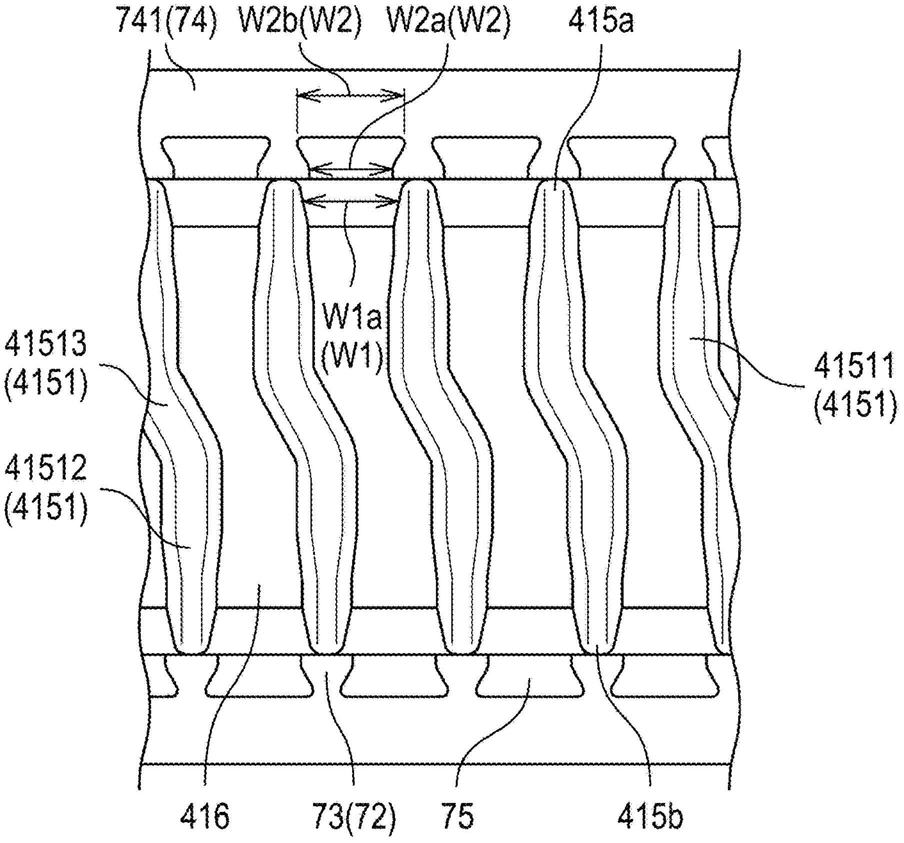
FIG. 10 is a plan view illustrating a specific configuration of pattern C illustrated in FIG. 8.

FIG. 8 is a diagram schematically illustrating a plurality of examples of a placement pattern of outer slits 416 of slit outer blade 40 and grooves 75 of comb component 70. FIG. 9 is a plan view illustrating a specific configuration of pattern B illustrated in FIG. 8. FIG. 10 is a plan view illustrating a specific configuration of pattern C illustrated in FIG. 8. As illustrated in FIG. 8, conceivable examples of a method for disposing groove 75 so as to communicate with outer slit 416 include methods for placement on pattern A, pattern B, pattern C, pattern D, and pattern E. In FIG. 8, a solid line part in an upper stage indicates comb 72, a broken line part in the upper stage indicates groove 75, a solid line part in a lower stage indicates outer blade piece 415, and a broken line part in the lower stage indicates outer slit 416.

In the present exemplary embodiment, as illustrated in FIG. 7, an example of placement by the method of pattern A is shown. However, groove 75 is not required to be disposed so as to communicate with outer slit 416 only by the method of pattern A, and can be disposed by the method of pattern B, as illustrated in FIG. 9.

In the method of pattern B, as illustrated in FIG. 9, groove 75 is provided such that width W2 in the Y-direction (i.e., the second direction) is substantially constant, and outer slit 416 is provided such that width W1 in the Y-direction (i.e., the second direction) is substantially constant. Width W2 of groove 75 in the Y-direction (i.e., the second direction) is smaller than width W1 of outer slit 416 in the Y-direction (i.e., the second direction). Furthermore, in front view (i.e., in a state viewed in the X-direction), Groove 75 and outer slit 416 communicate with each other in a state where both ends of groove 75 in the Y-direction are located between one end and the other end of outer slit 416 in the Y-direction.

This also allows whisker H (i.e., an example of body hair) introduced into groove 75 to be more reliably introduced into outer slit 416.

As illustrated in FIG. 10, placement by the method of pattern C is available.

In the method of pattern C, as illustrated in FIG. 10, groove 75 is provided such that widths W2 in the Y-direction (i.e., the second direction) at one end and the other end in the X-direction are different from each other. Specifically, width W2*b* of groove 75 in the Y-direction (i.e., the second direction) on a side opposite to outer slit 416 is larger than width W2*a* of groove 75 in the Y-direction (i.e., the second direction) on a side close to outer slit 416.

Outer slit 416 is provided such that width W1 in the Y-direction (i.e., the second direction) is substantially constant. Width W2*a* of groove 75 in the Y-direction (i.e., the second direction) on the side close to outer slit 416 is equal to width W1*a* of outer slit 416 in the Y-direction (i.e., the second direction) on the side close to groove 75.

Groove 75 and outer slit 416 communicate with each other in a state where one end of groove 75 in the Y-direction (i.e., the second direction) on the side close to outer slit 416 and one end of outer slit 416 in the Y-direction (i.e., the second direction) on the side close to groove 75 are aligned in front view (i.e., in a state viewed in the X-direction), and the other end of groove 75 in the Y-direction (i.e., the second direction) on the side close to outer slit 416 and the other end of outer slit 416 in the Y-direction (i.e., the second direction) on the side close to groove 75 are aligned in the front view.

This also allows whisker H (i.e., an example of body hair) introduced into groove 75 to be more efficiently introduced into outer slit 416 along with increase in the introduction efficiency of whisker H (i.e., an example of body hair) into groove 75.

Placement by the method of pattern D is also available.

In the method of pattern D, groove 75 is provided such that width W2 in the Y-direction (i.e., the second direction) is substantially constant, and outer slit 416 is provided such that width W1 in the Y-direction (i.e., the second direction) is substantially constant. Width W2 of groove 75 in the Y-direction (i.e., the second direction) is larger than width W1 of outer slit 416 in the Y-direction (i.e., the second direction). Groove 75 and outer slit 416 communicate with each other in a state where both ends of outer slit 416 in the Y-direction are located between one end and the other end of groove 75 in the Y-direction.

Placement by the method of pattern E is also available.

In the method of pattern E, groove 75 is provided such that width W2 in the Y-direction (i.e., the second direction) is substantially constant, and outer slit 416 is provided such that width W1 in the Y-direction (i.e., the second direction) is substantially constant. Width W2 of groove 75 in the Y-direction (i.e., the second direction) is equal to width W1 of outer slit 416 in the Y-direction (i.e., the second direction). Groove 75 and outer slit 416 communicate with each other in a state where a part of outer slit 416 overlaps with a part of groove 75 in front view (i.e., in a state viewed in the X-direction).

Groove 75 can be disposed to communicate with outer slit 416 by a method other than patterns A to E.

Although an example in which first protrusion 741 extending from one end to the other end of slit outer blade part 413 in the Y-direction is provided on comb 72 is shown in the present exemplary embodiment, a method for providing first protrusion 741 on comb 72 is not limited to a method as in the example, and first protrusion 741 can be provided on comb 72 by various methods.

Figure 11:
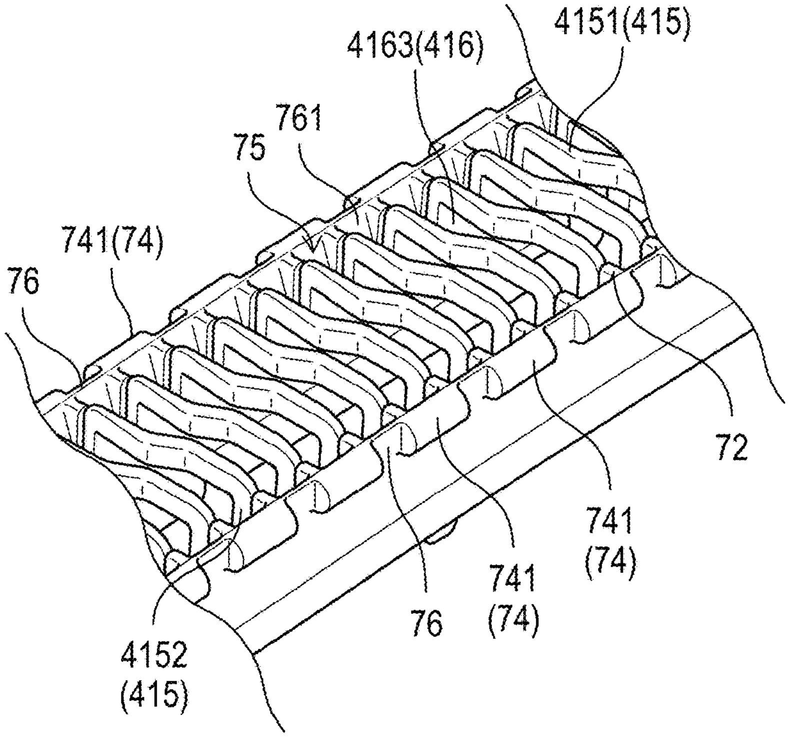
FIG. 11 is a perspective view illustrating a first modification of the comb component in the exemplary embodiment.
Figure 12:
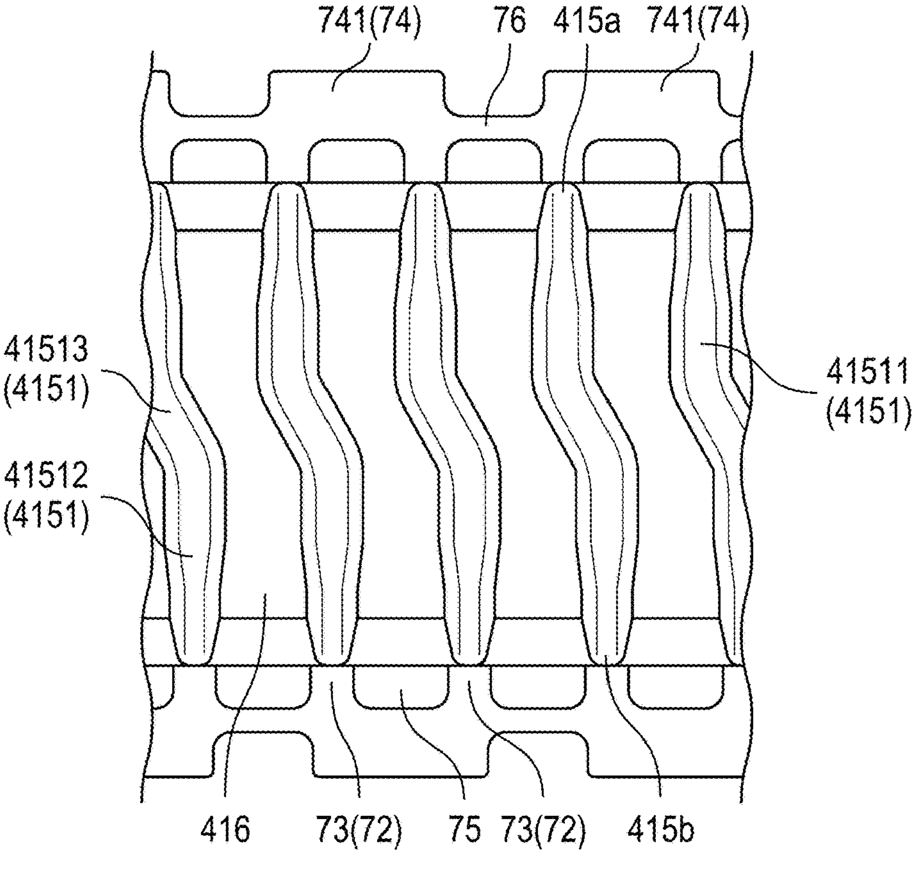
FIG. 12 is a plan view illustrating the first modification of the comb component in the exemplary embodiment.
Figure 13:
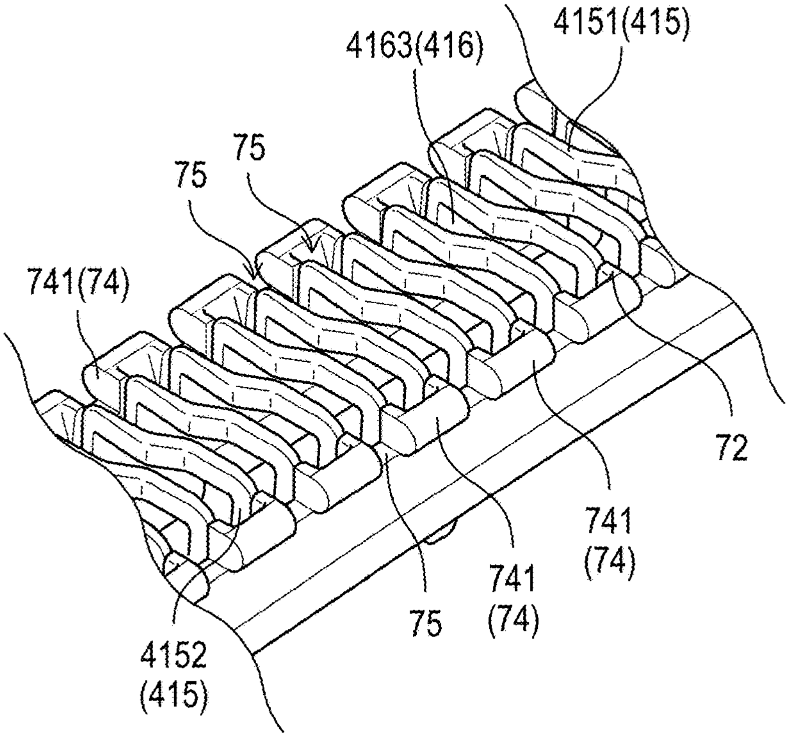
FIG. 13 is a perspective view illustrating a second modification of the comb component in the exemplary embodiment.
Figure 14:
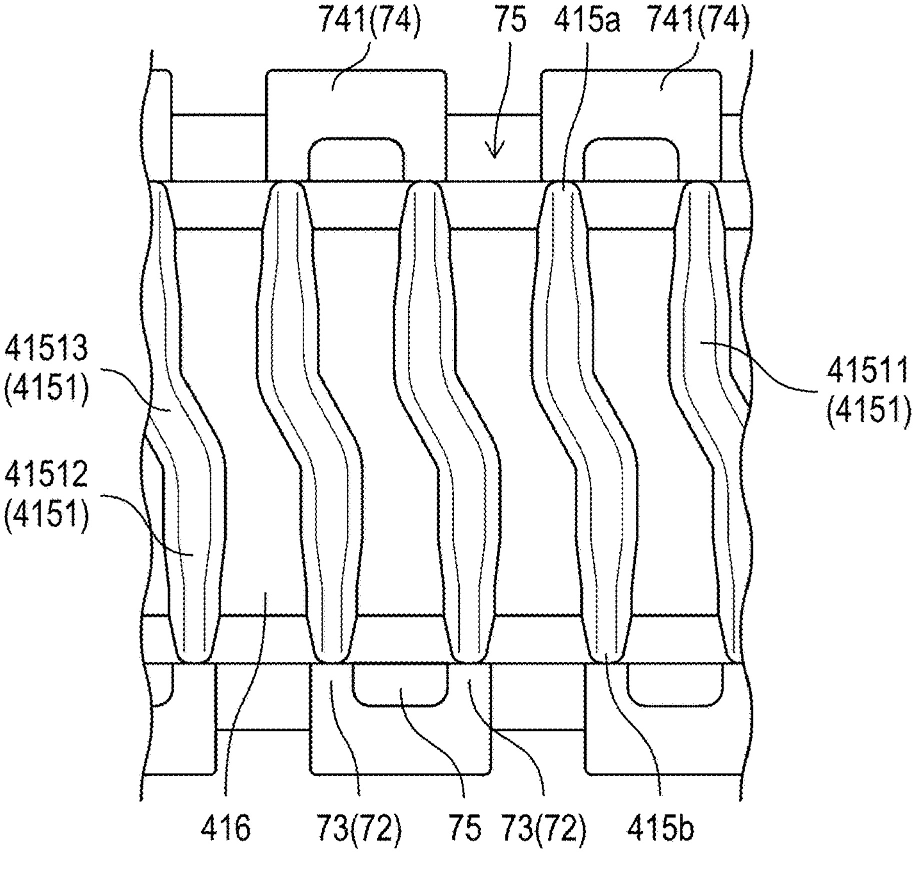
FIG. 14 is a plan view illustrating the second modification of the comb component in the exemplary embodiment.

FIG. 11 is a perspective view illustrating a first modification of comb component 70 in the exemplary embodiment. FIG. 12 is a plan view illustrating the first modification of comb component 70 in the exemplary embodiment. FIG. 13 is a perspective view illustrating a second modification of comb component 70 in the exemplary embodiment. FIG. 14 is a plan view illustrating the second modification of comb component 70 according to the exemplary embodiment. For example, as illustrated in FIGS. 11 and 12, protrusion 74 provided so as to protrude outward in the X-direction from the upper end of support part 73 may include a plurality of first protrusions 741 extending across two support parts 73 (i.e., one element of comb 72) disposed side by side in the Y-direction (i.e., the second direction).

This also further reduces stimulation applied to skin S.

In FIGS. 11 and 12 each illustrate an example in which partition wall 76 defining an outside of groove 75 in the X-direction (i.e., the first direction) is provided between first protrusions 741 adjacent to each other in the Y-direction (i.e., the second direction); however, as illustrated in FIGS. 13 and 14, partition wall 76 defining the outside of groove 75 in the X-direction (i.e., the first direction) does not have to be provided between first protrusions 741 adjacent to each other in the Y-direction (i.e., the second direction).

The structure illustrated in FIGS. 13 and 14 suppresses decrease in efficiency of introducing whisker H (i.e., an example of body hair) into groove 75.

Alternatively, a plurality of types of first protrusions 741 different in length in the Y-direction can be provided on support part 73 (i.e., one element of comb 72), and first protrusions 741 on one side and the other side in the X-direction can be different from each other in at least one of shape and placement position.

Figure 15:
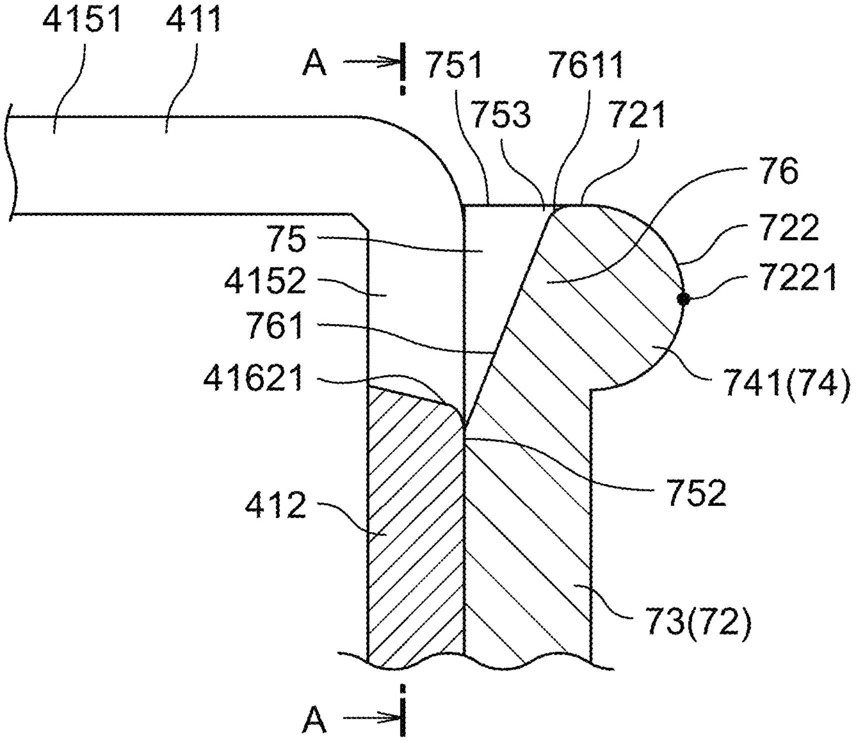
FIG. 15 is a cross-sectional view of the slit outer blade body and the comb component taken along a part corresponding to the groove in a state where the slit outer blade body according to the exemplary embodiment is attached to the comb component.
Figure 16:
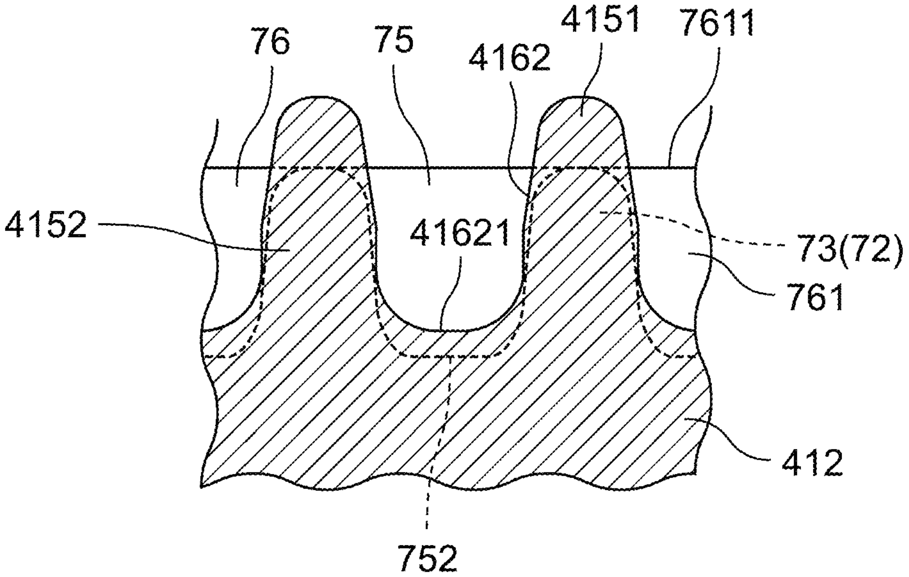
FIG. 16 is a cross-sectional view taken along line A-A of FIG. 15.
Figure 17:
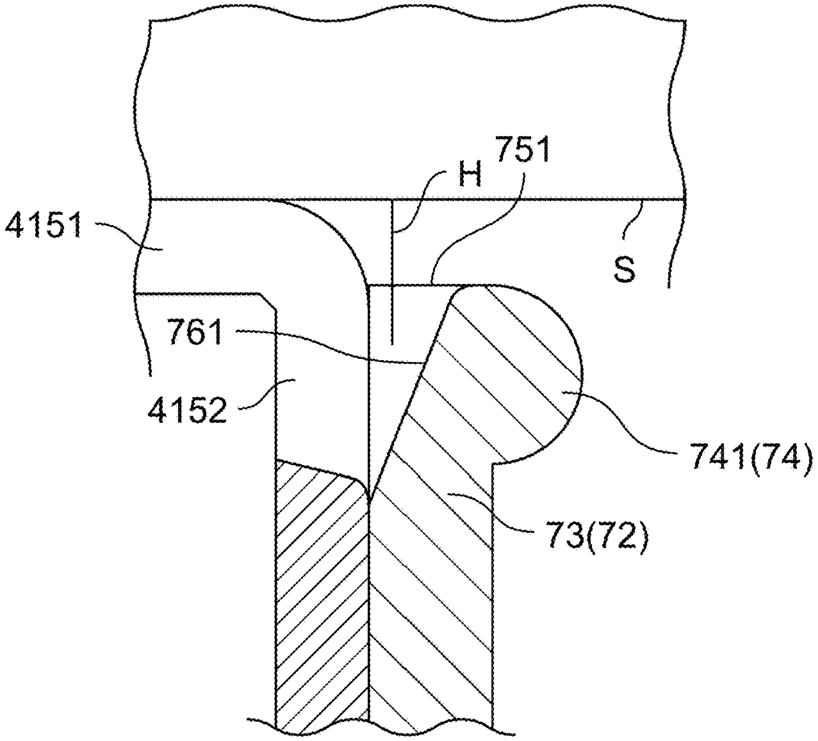
FIG. 17 is a diagram schematically illustrating a state where a whisker is introduced into the groove of the slit blade block according to the exemplary embodiment.

Next, specific structure of groove 75 according to the present exemplary embodiment will be described. FIG. 15 is a cross-sectional view of slit outer blade body 410 and comb component 70 taken along a part corresponding to groove 75 in a state where slit outer blade body 410 according to the exemplary embodiment is attached to comb component 70. FIG. 16 is a cross-sectional view taken along line A-A of FIG. 15. FIG. 17 is a diagram schematically illustrating a state where whisker H is introduced into groove 75 of slit blade block 30 in the exemplary embodiment.

In the present exemplary embodiment, as illustrated in FIG. 15, partition wall 76 is provided between combs 72 adjacent to each other in the Y-direction (i.e., the second direction). This enhances rigidity of comb 72. Inner surface 761 inside partition wall 76 in the X-direction (i.e., the first direction) defines the outside of groove 75 in the X-direction (i.e., the first direction). Inner surface 761 is inclined so as to increase depth of groove 75 toward slit outer blade 40.

As described above, in the present exemplary embodiment, groove 75 is provided so as to have a shape of a substantially right triangle in which the outside in the X-direction (i.e., the first direction) is the oblique side thereof in side view (i.e., in a state viewed in the Y-direction).

This allows volume of groove 75 to be reduced along with security of an area of opening 751 of groove 75. In this way, as illustrated in FIG. 17, along with enhancement of introduction properties of whisker H (i.e., an example of body hair) into groove 75, rigidity of combs 72 can be more reliably prevented from be decreased.

In the present exemplary embodiment, end 7611 in inner surface 761 of partition wall 76 is curved in an R shape when viewed in the Y-direction (i.e., the second direction), end 7611 facing opening 751 of groove 75.

This further reduces stimulation applied to skin S by preventing an edge from being provided at end 7611 of inner surface 761, end 7611 facing opening 751 and being likely to come into contact with skin S when whisker H (i.e., an example of body hair) is introduced into groove 75.

As illustrated in FIGS. 15 and 16, groove 75 is provided such that lower end 752 is located below lower end 41621 of outer lateral slit 4162 (i.e., the second slit). That is, in a state where opening 751 faces upward, groove 75 is provided so as to have a depth larger than lower end 41621 of outer lateral slit 4162 (i.e., the second slit).

In the present exemplary embodiment, as illustrated in FIG. 16, lower end 752 of groove 75 is provided so as to have a depth larger than 41621 of outer lateral slit 4162 (i.e., the second slit) from one end to the other end in the Y-direction.

Combs 72 are not exposed to outer lateral slit 4162 (i.e., the second slit) in front view (i.e., in a state viewed in the X-direction).

This allows whisker H (i.e., an example of body hair) introduced into groove 75 to be more efficiently introduced into outer slit 416 by effectively using a space of outer lateral slit 4162 (i.e., the second slit) when whisker H (i.e., an example of body hair) introduced into groove 75 is introduced into outer slit 416.

In the present exemplary embodiment, each of combs 72 has curved surface 722 so as to be convex outward in the X-direction (i.e., the first direction) and flat surface 721 connected to an upper end of curved surface 722 and extending horizontally, when viewed in the Y-direction (i.e., the second direction) by causing opening 751 of groove 75 to face upward.

Groove 75 is provided such that outward end 753 in the X-direction (i.e., the first direction) is located on flat surface 721, outward end 753 facing opening 751 of groove 75, when viewed in the Y-direction (i.e., the second direction) by causing opening 751 of groove 75 to face upward.

Groove 75 described above can be obtained by forming inner surface 761 provided in a plane intersecting flat surface 721, for example.

In this way, groove 75 is provided with a large area of curved surface 722 which is a part to come into contact with skin S of the user when whisker H (i.e., an example of body hair) is shaved. As a result, deterioration in performance of introducing whisker H (i.e., an example of body hair) into groove 75 is suppressed as much as possible, and stimulation applied to skin S is further suppressed.

Figure 18:
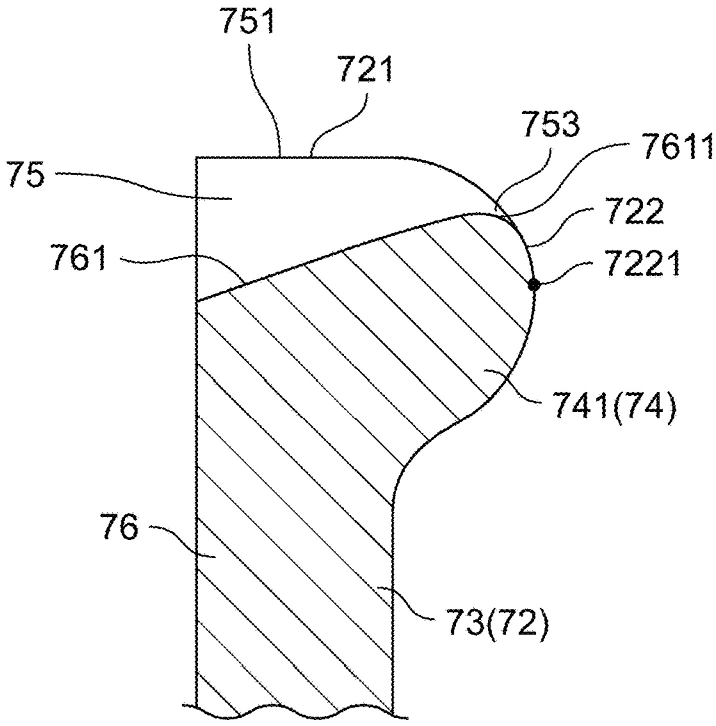
FIG. 18 is a cross-sectional view illustrating a third modification of the comb component in the exemplary embodiment.

FIG. 18 is a cross-sectional view illustrating a third modification of comb component 70 in the exemplary embodiment. As illustrated in FIG. 18, groove 75 may be provided such that outward end 753 in the X-direction (i.e., the first direction) is located on curved surface 722 above apex 7221, outward end 753 facing opening 751 of groove 75, when viewed in the Y-direction (i.e., the second direction) by causing opening 751 of groove 75 to face upward.

Groove 75 described above can be obtained by forming inner surface 761 provided in a plane intersecting curved surface 722 above apex 7221, for example.

In this way, the opening area of groove 75 is increased, and curved surface 722 serving to come into contact with skin S of the user when whisker H (i.e., an example of body hair) is shaved can be secured. As a result, the performance of introducing whisker H (i.e., an example of body hair) into groove 75 can be improved, and stimulation applied to skin S is suppressed as much as possible.

Operation and Effect

Hereinafter, a characteristic configuration of the slit blade block and the electric razor described in the exemplary embodiment and the modifications thereof, and an effect obtained by the characteristic configuration will be described.

Slit blade block 30 described in the exemplary embodiment and the modifications thereof includes slit outer blade 40 having a plurality of outer blade pieces 415 extending in the X-direction (i.e., the first direction) and spaced apart in the Y-direction (i.e., the second direction) intersecting the X-direction (i.e., the first direction). Slit blade block 30 includes comb component 70 including a plurality of combs 72 disposed outside slit outer blade 40 in the X-direction (i.e., the first direction) and spaced apart from each other in the Y-direction (i.e., the second direction).

Outer slit 416 is provided between outer blade pieces 415 adjacent to each other in the Y-direction (i.e., the second direction), and groove 75 which communicates with outer slit 416 is provided between combs 72 adjacent to each other in the Y-direction (i.e., the second direction).

Comb component 70 includes protrusion 74 protruding outward in the X-direction (i.e., the first direction), and protrusion 74 includes first protrusion 741 extending across two or more combs 72 disposed side by side in the Y-direction (i.e., the second direction).

Electric razor 1 described in the exemplary embodiment and the modifications thereof includes slit blade block 30.

As described above, when whisker H (i.e., an example of body hair) is shaved by using slit blade block 30 having combs 72, introduction properties of whisker H (i.e., an example of body hair) is improved without changing a size of an interval between outer blade pieces 415 of slit outer blade 40.

Since comb 72 is provided with first protrusion 741 which is wide in the Y-direction (i.e., the second direction), first protrusion 741 which is wide is allowed to be brought into contact with skin S of the user, when whisker H (i.e., an example of body hair) is shaved. As a result, stimulation applied to skin S can be further reduced.

As described above, by using slit blade block 30 and electric razor 1 described in the exemplary embodiment and the modifications thereof, whisker H (i.e., an example of body hair) can be more efficiently shaved along with suppression of stimulation applied to skin S.

A position of groove 75 in the Y-direction (i.e., the second direction) and a position of outer slit 416 in the Y-direction (i.e., the second direction) may be the same as each other.

In this way, whisker H (i.e., an example of body hair) introduced into groove 75 can be more reliably prevented from being stepped on by outer blade pieces 415 of slit outer blade 40 and failing to be cut, when whisker H (i.e., an example of body hair) is shaved. As a result, whisker H (i.e., an example of body hair) introduced into groove 75 can be directly cut, so that whisker H (i.e., an example of body hair) can be shaved more efficiently.

Width W2*a* of groove 75 in the Y-direction (i.e., the second direction) on the side close to outer slit 416 may be equal to width W1*a* of outer slit 416 in the Y-direction (i.e., the second direction) on the side close to groove 75.

In this way, whisker H (i.e., an example of body hair) introduced into groove 75 can be more efficiently introduced into outer slit 416, and thus whisker H (i.e., an example of body hair) can be shaved more efficiently.

Width W2*b* of groove 75 in the Y-direction (i.e., the second direction) on the side opposite to outer slit 416 may be larger than width W2*a* of groove 75 in the Y-direction (i.e., the second direction) on the side close to outer slit 416.

This allows whisker H (i.e., an example of body hair) introduced into groove 75 to be more efficiently introduced into outer slit 416 along with increase in introduction efficiency of whisker H (i.e., an example of body hair) into groove 75. As a result, whisker H (i.e., an example of body hair) can be shaved more efficiently.

One end of outer blade piece 415 at one end in the X-direction (i.e., the first direction) and the other end of outer blade piece 415 at the other end in the X-direction (i.e., the first direction) may be shifted from each other in the Y-direction (i.e., the second direction).

This allows whisker H (i.e., an example of body hair) which has been stepped on by outer blade piece 415 during movement in one direction and has not been introduced into outer slit 416 to be introduced into outer slit 416 during movement in the other direction, when whisker H (i.e., an example of body hair) is shaved while outer blade pieces 415 are reciprocated in the X-direction (i.e., the first direction). Thus, when whisker H (i.e., an example of body hair) is shaved along with reciprocation in the X-direction (i.e., the first direction), whisker H (i.e., an example of body hair) can be shaved more efficiently.

Combs 72 are provided on both sides in the X-direction, and combs 72 on one side in the X-direction (i.e., the first direction) may be provided such that the positions thereof in the Y-direction (i.e., the second direction) are the same as that of one end **415*a* of outer blade piece 415 in the X-direction (i.e., the first direction). Combs 72 on the other side in the X-direction (i.e., the first direction) may be provided such that the positions thereof in the Y-direction (i.e., the second direction) are the same as that of the other end 415*b* of outer blade piece 415** in the X-direction (i.e., the first direction).

In this way, whisker H (i.e., an example of body hair) introduced into groove 75 can be more efficiently introduced into outer slit 416, and thus whisker H (i.e., an example of body hair) can be shaved more efficiently.

First protrusion 741 may be provided so as to extend from first comb 72 to second comb 72, the first comb 72 being included in the plurality of the comb 72 and located at one end in the Y-direction (i.e., the second direction), and the second comb 72 being included in the plurality of the comb and located at the other end in the Y-direction (i.e., the second direction).

In this way, skin S can be more reliably prevented from coming into contact with outer blade pieces 415 when whisker H (i.e., an example of body hair) is shaved, so that stimulation applied to skin S can be further reduced.

Partition wall 76 may be provided between combs 72 adjacent to each other in the Y-direction (i.e., the second direction), and may have inner surface 761 inside in the X-direction (i.e., the first direction) that defines the outside of groove 75 in the X-direction (i.e., the first direction). Inner surface 761 may be inclined so as to increase depth of groove 75 toward slit outer blade 40.

This allows volume of groove 75 to be reduced along with security of an opening area of groove 75 and improvement of introduction properties of whisker H (i.e., an example of body hair). As a result, reduction in rigidity of comb 72 can be more reliably suppressed.

Inner surface 761 may include end 7611 facing opening 751 of groove 75, end 7611 being curved in an R-shape when viewed in the Y-direction (i.e., the second direction).

This prevents an edge from being formed at end 7611 of inner surface 761 more reliably, end 7611 facing opening 751 and being likely to come into contact with skin S when whisker H (i.e., an example of body hair) is introduced into groove 75. As a result, stimulation applied to skin S can be further reduced.

Slit outer blade 40 may include top wall 411 (i.e., the first wall part) having skin contact surface 4111 which can come into contact with skin S, and side wall 412 (i.e., the second wall part) connected to top wall 411 (i.e., the first wall part). Furthermore, outer slit 416 may further include outer upper slit 4161 (i.e., the first slit) 4161 provided in top wall 411 (i.e., the first wall part) and outer lateral slit 4162 (i.e., the second slit) provided in side wall 412 (i.e., the second wall part) to communicate with outer upper slit 4161 (i.e., the first slit). Groove 75 may be provided so as to have a depth larger than lower end 41621 of outer lateral slit 4162 (i.e., the second slit) in a state where opening 751 faces upward.

In this way, the space of outer lateral slit 4162 (i.e., the second slit) can be effectively used when whisker H (i.e., an example of body hair) introduced into groove 75 is introduced into outer slit 416 whisker H (i.e., an example of body hair), so that whisker H (i.e., an example of body hair) introduced into groove 75 can be more efficiently introduced into outer slit 416.

Protrusion 74 may have a shape curved so as to be convex outward in the X-direction (i.e., the first direction) when viewed in the Y-direction (i.e., the second direction).

In this way, the curved part of protrusion 74 is brought into contact with skin S of the user when whisker H (i.e., an example of body hair) is shaved, so that stimulation applied to skin S can be further reduced.

Comb 72 may have curved surface 722 so as to be convex outward in the X-direction (i.e., the first direction) and flat surface 721 connected to an upper end of curved surface 722 and extending horizontally when viewed in the Y-direction (i.e., the second direction) by causing opening 751 of groove 75 to face upward. When viewed in the Y-direction (i.e., the second direction) by causing opening 751 of groove 75 to face upward, outward end 753 of groove 75 in the X-direction (i.e., the first direction), outward end 753 facing opening 751, may be located on flat surface 721.

This allows groove 75 to be formed with a large area of curved surface 722 which is a part to come into contact with skin S of the user when whisker H (i.e., an example of body hair) is shaved. As a result, deterioration in performance of introducing whisker H (i.e., an example of body hair) into groove 75 is suppressed as much as possible, and stimulation applied to skin S can be further reduced while.

Each of the plurality of the comb 72 may comprise curved surface 722 that protrudes outward in the X-direction (i.e., the first direction) and flat surface 721 that is connected to an upper end of curved surface 722 and extends horizontally when viewed in the Y-direction (i.e., the second direction) by causing opening 751 of groove 75 to face upward. The groove 75 may comprise outward end 753 of groove 75 in the X direction (i.e., the first direction), outward end 753 of groove 75 facing opening 751 of groove 75 and being located on a part of curved surface 722, the part being above apex 7221 of curved surface 722 when viewed in the Y-direction (i.e., the second direction) by causing opening 751 of groove 75 to face upward.

This allows securing curved surface 722 which is a part to come into contact with skin S of the user when whisker H (i.e., an example of body hair) is shaved along with increase in the opening area of groove 75. As a result, stimulation applied to skin S is suppressed as much as possible, and the performance of introducing whisker H (i.e., an example of body hair) into groove 75 can be improved.

[Others] Although the contents of the slit blade block and the electric razor according to the present disclosure have been described above, the present disclosure is not limited to these descriptions, and it is obvious to those skilled in the art that various modifications and improvements can be made.

For example, the present disclosure can be applied to exemplary embodiments in which changes, replacements, additions, omissions, and the like of the configurations described in the above exemplary embodiment and the modifications thereof are made. Additionally, the components described in the exemplary embodiment and the modifications thereof may be combined to make a new exemplary embodiment.

Although the exemplary embodiment and its modifications each show an example in which electric razor 1 includes grip part 11 and head part 12, the present disclosure is also applicable to an electric razor provided with no head part.

Specifications (shape, size, layout, and the like) of the outer blade piece, the inner blade piece, and other details can also be changed as appropriate.

INDUSTRIAL APPLICABILITY

As described above, the slit blade block and the electric razor according to the present disclosure can shave body hair more efficiently while suppressing stimulation applied to skin, and thus can be applied to treatment of not only whiskers but also various body hairs, for example.

REFERENCE MARKS IN THE DRAWINGS

1 electric razor
10 razor body
11 grip part
111 body housing
111*a* power supply switch
12 head part
121 head part body
121*a* release button
122 head cover
122*a* upper opening
13 drive pole
20 blade unit
200 outer blade cassette
20*a* skin contact surface
21 first blade block
211 first net blade
212 first inner blade
22 second blade block
221 second net blade
23 outer blade case
23*a* release button
30 slit blade block
40 slit outer blade
410 slit outer blade body
411 top wall
4111 skin contact surface
4112 inner surface
412 side wall
4121 first weld fixing part
4122 second weld fixing part
4123 first claw piece
4124 second claw piece
4125 fitting hole
413 slit outer blade part
414 coupling part
415 outer blade piece
415*a* one end
415*b* the other end
4151 upper outer blade piece
41511 first piece part
41512 second piece part
4152 lateral outer blade piece
416 outer slit
4161 outer upper slit
4162 outer lateral slit
41621 lower end
4163 outer internal space
420 outer blade joint
421 joint body
422 mount part
4221 outward part
4222 inward part
423 protrusion
424 first weld part
425 second weld part
426 spring mount part
50 slit inner blade
510 slit inner blade body
511 top wall
5111 upper surface
512 side wall
5121 positioning part

5122 weld fixing part
513 slit inner blade part
514 coupling part
515 inner blade piece
5151 upper inner blade piece
5152 lateral inner blade piece
516 inner slit
5161 inner upper slit
5162 inner lateral slit
5163 inner internal space
520 inner blade joint
521 joint body
522 fitting recess
523 positioning part
524 weld part
525 spring mount part
60 coil spring
70 comb component
71 comb support wall
710 support wall body
711 first through-hole
712 second through-hole
713 fitting protrusion
72 comb
721 flat surface
722 curved surface
7221 apex
73 support part
74 protrusion
741 first protrusion
75 groove
751 opening
752 lower end
753 end
76 partition wall
761 inner surface
7611 end
77 comb end wall
771 end wall body
772 protrusion
S skin
H whisker
W1*a* width of slit in second direction on groove side
W2*a* width of groove in second direction on slit side
W2*b* width of groove in second direction on side opposite to slit side
X first direction
Y second direction

The invention claimed is:

1. A slit blade block comprising:

a slit outer blade comprising a plurality of outer blade pieces extending in a first direction and spaced apart from each other in a second direction intersecting the first direction; and a comb component comprising a plurality of combs provided outside the slit outer blade in the first direction and spaced apart from each other in the second direction, wherein an outer slit is provided between two adjacent outer blade pieces of the plurality of outer blade pieces, the two adjacent outer blade pieces being adjacent to each other in the second direction, a groove which communicates with the outer slit is provided between two adjacent combs of the plurality of combs, the two adjacent combs being adjacent to each other in the second direction, the comb component comprises a protrusion protruding outward in the first direction, the protrusion comprises a first protrusion that extends across two or more of combs of the plurality of combs, the two or more of combs being disposed side by side in the second direction, the comb component includes a comb support wall extending in the second direction and a third direction intersecting the first direction and the second direction, the comb support wall includes a support wall body, the plurality of combs are provided at an upper end of each support wall body so as to protrude in the third direction and be spaced apart from each other in the second direction, each of the plurality of combs includes a support part provided at the upper end of each support wall body so as to protrude in the third direction, and the protrusion extends continuously in the first direction and protrudes from an upper end of the support part of each of the plurality of combs, the upper end of the support part of each of the plurality of combs being an end of the support part in the third direction.

2. The slit blade block according to claim 1, wherein the groove and the outer slit face each other in the first direction and communicate with each other.

3. The slit blade block according to claim 1, wherein a width of the groove in the second direction on a side close to the outer slit is equal to a width of the outer slit in the second direction on a side close to the groove.

4. The slit blade block according to claim 3, wherein a width of the groove in the second direction on a side opposite to the outer slit is larger than the width of the groove in the second direction on a side close to the outer slit.

5. The slit blade block according to claim 1, wherein each of the plurality of outer blade pieces is provided such that one end thereof in the first direction and the other end thereof in the first direction are shifted from each other in the second direction.

6. The slit blade block according to claim 5, wherein the plurality of combs are provided on both sides in the first direction, combs on one side in the first direction are provided such that the positions thereof in the second direction are the same as that of the one end of the plurality of outer blade pieces in the first direction, the combs on one side in the first direction being included in the plurality of combs, and combs on the other side in the first direction are provided such that the positions thereof in the second direction are the same as that of the other end of the plurality of outer blade pieces in the first direction, the combs on the other side in the first direction being included in the plurality of combs.

7. The slit blade block according to claim 1, wherein the first protrusion is provided so as to extend from a first comb of the plurality of combs to a second comb of the plurality of combs, where the first comb is included in the plurality of combs and located at one end in the second direction, and the second comb is included in the plurality of combs and located at the other end in the second direction.

8. The slit blade block according to claim 1, wherein a partition wall is provided between the two adjacent combs which are adjacent to each other in the second direction, the partition wall comprises an inner surface inside in the first direction, the inner surface defining an outside of the groove in the first direction, and the inner surface is inclined so as to increase depth of the groove toward the slit outer blade.

9. The slit blade block according to claim 8, wherein the inner surface comprises an end facing an opening of the groove, the end being curved in an R-shape as viewed in the second direction.

10. The slit blade block according to claim 1, wherein the slit outer blade comprises a first wall part having a skin contact surface to be in contact with skin, and a second wall part connected to the first wall part, the outer slit comprises a first slit provided in the first wall part and a second slit provided in the second wall part, the second slit communicating with the first slit, and the groove is provided so as to have a depth larger than a lower end of the second slit in a state where an opening of the groove faces upward.

11. The slit blade block according to claim 1, wherein the protrusion has a shape curved so as to be convex outward in the first direction when viewed in the second direction.

12. The slit blade block according to claim 1, wherein each of the plurality of combs comprises a curved surface that protrudes outward in the first direction and a flat surface that is connected to an upper end of the curved surface and extends horizontally when viewed in the second direction by causing an opening of the groove to face upward, and the groove comprises an outward end of the groove in the first direction, the outward end of the groove facing the opening of the groove and being located on the flat surface when viewed in the second direction by causing the opening of the groove to face upward.

13. The slit blade block according to claim 1, wherein each of the plurality of combs comprises a curved surface that protrudes outward in the first direction and a flat surface that is connected to an upper end of the curved surface and extends horizontally when viewed in the second direction by causing an opening of the groove to face upward, and the groove comprises an outward end of the groove in the first direction, the outward end of the groove facing the opening of the groove and being located on a part of the curved surface, the part being above an apex of the curved surface when viewed in the second direction by causing the opening of the groove to face upward.

14. An electric razor comprising the slit blade block according to claim 1.

15. The slit blade block according to claim 1, wherein the upper end of the support part consists of a flat plane.

* * * * *